United States Patent
Nakashima et al.

(10) Patent No.: US 9,479,968 B2
(45) Date of Patent: Oct. 25, 2016

(54) WIRELESS COMMUNICATION SYSTEM, MOBILE STATION DEVICE, AND BASE STATION DEVICE

(71) Applicant: SHARP KABUSHIKI KAISHA, Osaka-shi, Osaka (JP)

(72) Inventors: Daiichiro Nakashima, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 14/262,551

(22) Filed: Apr. 25, 2014

(65) Prior Publication Data

US 2014/0321420 A1  Oct. 30, 2014

Related U.S. Application Data

(63) Continuation of application No. 13/125,352, filed as application No. PCT/JP2009/004043 on Aug. 21, 2009, now abandoned.

(30) Foreign Application Priority Data

Oct. 29, 2008  (JP) .................................. 2008-278517

(51) Int. Cl.
*H04W 4/00* (2009.01)
*H04W 28/26* (2009.01)
(Continued)

(52) U.S. Cl.
CPC .......... *H04W 28/26* (2013.01); *H04J 13/0062* (2013.01); *H04J 13/18* (2013.01);
(Continued)

(58) Field of Classification Search
CPC .............. H04W 28/04; H04W 72/04–72/0473
USPC ................................................ 370/310–350
See application file for complete search history.

(56) References Cited

U.S. PATENT DOCUMENTS

2005/0143123 A1  6/2005  Black et al.
2006/0268919 A1*  11/2006  Malladi ................. H04L 1/0029
370/432

(Continued)

FOREIGN PATENT DOCUMENTS

EP  2 161 864 A1  3/2010
EP  2 207 271 A1  7/2010
(Continued)

OTHER PUBLICATIONS

3GPP TSG RAN WG1 #52, R1-080675, Samsung, Configuration of PDCCH candidate sets for the control of blind decoding attempts, Sorrento, Italy, Feb. 11-15, 2008.
(Continued)

*Primary Examiner* — Andrew Chriss
*Assistant Examiner* — Kenan Cehic
(74) *Attorney, Agent, or Firm* — Birch, Stewart, Kolasch & Birch, LLP

(57) ABSTRACT

A base station device includes: a control information generating section which generates control information specific to mobile station devices; a control information count indicator generating section which generates a control information count indicator indicating the number of pieces of generated control information of each mobile station device; and a transmitting section which transmits the control information count indicator and the control information. The mobile station device includes: a receiving section which receives a control information count indicator and control information transmitted from the base station device within a mobile station-specific search space selected based on a mobile station ID of the mobile station device; a control information count indicator detecting section which detects the control information indicator; and a control channel decoding section which decodes the control channel in response to the number of pieces of detected control information.

10 Claims, 18 Drawing Sheets

(51) Int. Cl.
*H04J 13/00* (2011.01)
*H04J 13/18* (2011.01)
*H04W 72/04* (2009.01)
*H04L 5/00* (2006.01)
*H04W 72/14* (2009.01)

(52) U.S. Cl.
CPC ............ *H04L 5/001* (2013.01); *H04L 5/0053* (2013.01); *H04L 5/0091* (2013.01); *H04W 72/0453* (2013.01); *H04L 5/0007* (2013.01); *H04W 72/14* (2013.01)

(56) References Cited

U.S. PATENT DOCUMENTS

| | | | |
|---|---|---|---|
| 2008/0084853 A1 | 4/2008 | Kuchibhotla et al. | |
| 2008/0268888 A1 | 10/2008 | Chen et al. | |
| 2009/0046808 A1* | 2/2009 | Varadarajan | H04L 1/0067 375/302 |
| 2009/0088148 A1 | 4/2009 | Chung et al. | |
| 2009/0103562 A1 | 4/2009 | Frederiksen et al. | |
| 2009/0209247 A1* | 8/2009 | Lee | H04L 5/0007 455/422.1 |
| 2010/0290418 A1 | 11/2010 | Nishio et al. | |
| 2011/0141998 A1 | 6/2011 | Nishio et al. | |
| 2012/0177012 A1 | 7/2012 | Buckley et al. | |
| 2013/0176972 A1 | 7/2013 | Nishio et al. | |
| 2014/0204879 A1* | 7/2014 | Yang | H04L 5/0023 370/329 |

FOREIGN PATENT DOCUMENTS

| | | |
|---|---|---|
| JP | 2004-159303 A | 6/2004 |
| WO | WO 2008/083804 A2 | 7/2008 |
| WO | WO 2009/001594 A1 | 12/2008 |
| WO | WO 2009/057283 A1 | 5/2009 |
| WO | WO 2009/057286 A1 | 5/2009 |
| WO | WO 2009/087742 A1 | 7/2009 |
| WO | WO 2010/013960 A2 | 2/2010 |
| WO | WO 2010/018684 A1 | 2/2010 |

OTHER PUBLICATIONS

3GPP TSG RAN WG1 #52bis, R1-081406, NTT DoCoMo, PDCCH Allocation Based on Hashing Function Generation Method for PDCCH Blind Decoding, Shenzhen, China, Mar. 31-Apr. 4, 2008.
3GPP TSG RAN1 #51bis, R1-080079, Motorola, Search Space Definition: Reduced PDCCH Blind Detection for Split PDCCH Search Space, Sevilla, Spain, Jan. 14-18, 2008.
3GPP TSG RAN1 #53, R1-081948, NTT DoCoMo, Inc., "Proposals for LTE-Advanced Technologies", Kansas City, USA, May 5-9, 2008.
3GPP TSG-RAN #50bis, R1-074317, Nokia et al.,"Reducing the decoding complexity of the PDCCH", Shanghai, China, Oct. 8-12, 2007.
3GPP TSG-RAN WG1 #53bis, R1-082544, Warsaw, Poland, Qualcomm Europe, "Confusing Multiple PDCCH Aggregation Levels", Jun. 30-Jul. 4, 2008.
International Search Report dated Sep. 29, 2009 in International Application No. PCT/JP2009/004043.
R1-081101, Ericsson, "PDCCH blind decoding-Outcome of offline discussions".
TSG RAN1 #53 bis, R1-082468, "Carrier aggregation in LTE-Advanced", Warsaw, Poland, Jun. 30-Jul. 4, 2008.
U.S. Advisory Action issued in U.S. Appl. No. 13/125,352 on Mar. 7, 2014.
U.S. Office Action issued in U.S. Appl. No. 13/125,352 on Apr. 5, 2013.
U.S. Office Action issued in U.S. Appl. No. 13/125,352 on Nov. 26, 2013.
U.S. Restriction Requirement issued in U.S. Appl. No. 13/125,352 on Feb. 6, 2013.

* cited by examiner

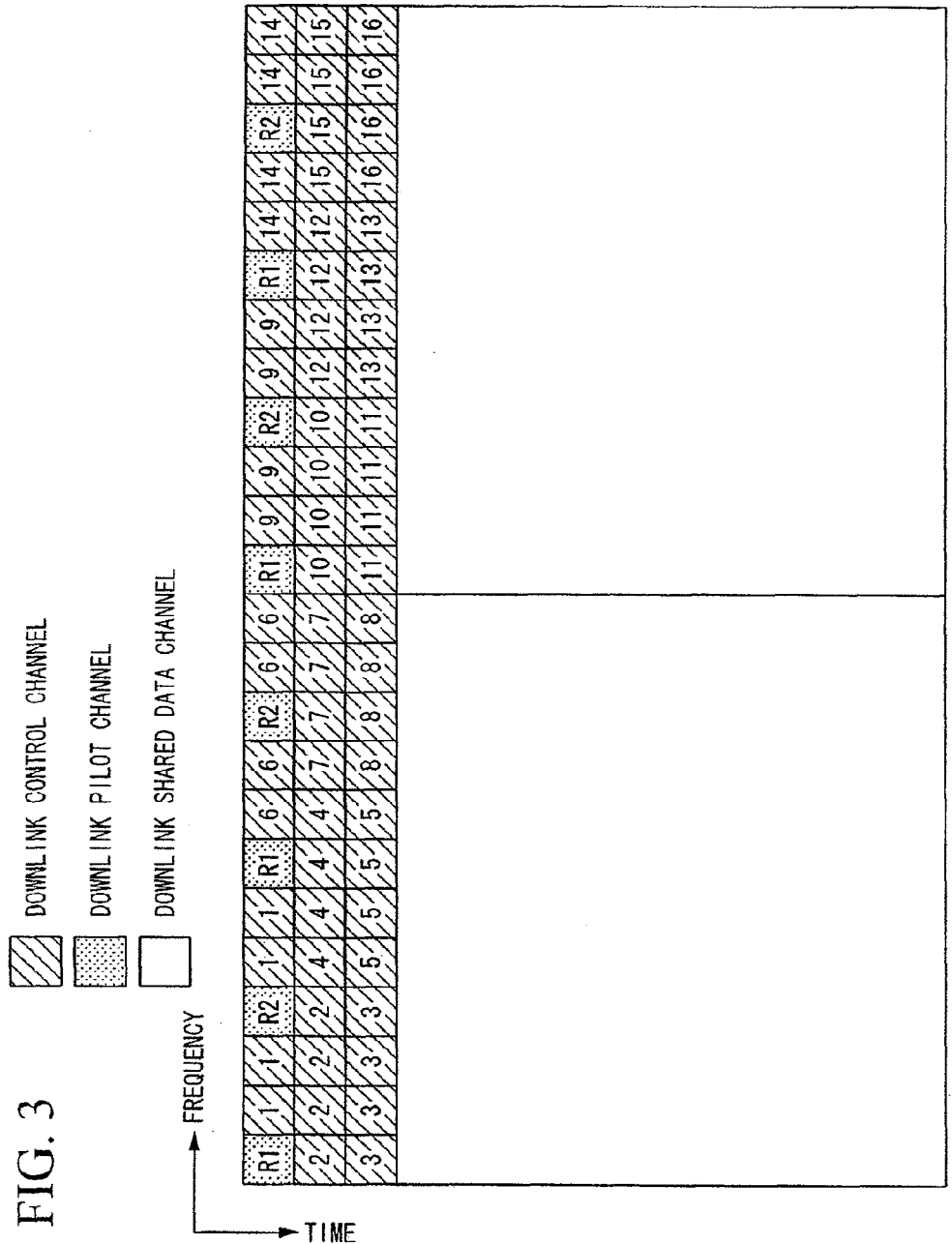

FIG. 4

| SUBBAND 1 | SUBBAND 2 | SUBBAND 3 | SUBBAND 4 | SUBBAND 5 |
|---|---|---|---|---|
| CCE 1 | CCE 21 | CCE 41 | CCE 61 | CCE 81 |
| CCE 2 | CCE 22 | CCE 42 | CCE 62 | CCE 82 |
| CCE 3 | CCE 23 | CCE 43 | CCE 63 | CCE 83 |
| CCE 4 | CCE 24 | CCE 44 | CCE 64 | CCE 84 |
| CCE 5 | CCE 25 | CCE 45 | CCE 65 | CCE 85 |
| CCE 6 | CCE 26 | CCE 46 | CCE 66 | CCE 86 |
| CCE 7 | CCE 27 | CCE 47 | CCE 67 | CCE 87 |
| CCE 8 | CCE 28 | CCE 48 | CCE 68 | CCE 88 |
| CCE 9 | CCE 29 | CCE 49 | CCE 69 | CCE 89 |
| CCE 10 | CCE 30 | CCE 50 | CCE 70 | CCE 90 |
| CCE 11 | CCE 31 | CCE 51 | CCE 71 | CCE 91 |
| CCE 12 | CCE 32 | CCE 52 | CCE 72 | CCE 92 |
| CCE 13 | CCE 33 | CCE 53 | CCE 73 | CCE 93 |
| CCE 14 | CCE 34 | CCE 54 | CCE 74 | CCE 94 |
| CCE 15 | CCE 35 | CCE 55 | CCE 75 | CCE 95 |
| CCE 16 | CCE 36 | CCE 56 | CCE 76 | CCE 96 |
| CCE 17 | CCE 37 | CCE 57 | CCE 77 | CCE 97 |
| CCE 18 | CCE 38 | CCE 58 | CCE 78 | CCE 98 |
| CCE 19 | CCE 39 | CCE 59 | CCE 79 | CCE 99 |
| CCE 20 | CCE 40 | CCE 60 | CCE 80 | CCE 100 |

FIG. 5D

| RBG 1 | RBG 2 | RBG 3 | RBG 4 | RBG 5 | RBG 6 | RBG 7 | RBG 8 | RBG 9 | RBG 10 | RBG 11 | RBG 12 | RBG 13 | RBG 14 | RBG 15 | RBG 16 | RBG 17 | RBG 18 | RBG 19 | RBG 20 | RBG 21 | RBG 22 | RBG 23 | RBG 24 | RBG 25 |
|---|---|---|---|---|---|---|---|---|---|---|---|---|---|---|---|---|---|---|---|---|---|---|---|---|
| 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 | 0 or 1 |

FIG. 14

| SUBBAND 1 | SUBBAND 2 | SUBBAND 3 | SUBBAND 4 | SUBBAND 5 |
|---|---|---|---|---|
| CCE (1, 1) | CCE (2, 1) | CCE (3, 1) | CCE (4, 1) | CCE (5, 1) |
| CCE (1, 2) | CCE (2, 2) | CCE (3, 2) | CCE (4, 2) | CCE (5, 2) |
| CCE (1, 3) | CCE (2, 3) | CCE (3, 3) | CCE (4, 3) | CCE (5, 3) |
| CCE (1, 4) | CCE (2, 4) | CCE (3, 4) | CCE (4, 4) | CCE (5, 4) |
| CCE (1, 5) | CCE (2, 5) | CCE (3, 5) | CCE (4, 5) | CCE (5, 5) |
| CCE (1, 6) | CCE (2, 6) | CCE (3, 6) | CCE (4, 6) | CCE (5, 6) |
| CCE (1, 7) | CCE (2, 7) | CCE (3, 7) | CCE (4, 7) | CCE (5, 7) |
| CCE (1, 8) | CCE (2, 8) | CCE (3, 8) | CCE (4, 8) | CCE (5, 8) |
| CCE (1, 9) | CCE (2, 9) | CCE (3, 9) | CCE (4, 9) | CCE (5, 9) |
| CCE (1, 10) | CCE (2, 10) | CCE (3, 10) | CCE (4, 10) | CCE (5, 10) |
| CCE (1, 11) | CCE (2, 11) | CCE (3, 11) | CCE (4, 11) | CCE (5, 11) |
| CCE (1, 12) | CCE (2, 12) | CCE (3, 12) | CCE (4, 12) | CCE (5, 12) |
| CCE (1, 13) | CCE (2, 13) | CCE (3, 13) | CCE (4, 13) | CCE (5, 13) |
| CCE (1, 14) | CCE (2, 14) | CCE (3, 14) | CCE (4, 14) | CCE (5, 14) |
| CCE (1, 15) | CCE (2, 15) | CCE (3, 15) | CCE (4, 15) | CCE (5, 15) |
| CCE (1, 16) | CCE (2, 16) | CCE (3, 16) | CCE (4, 16) | CCE (5, 16) |
| CCE (1, 17) | CCE (2, 17) | CCE (3, 17) | CCE (4, 17) | CCE (5, 17) |
| CCE (1, 18) | CCE (2, 18) | CCE (3, 18) | CCE (4, 18) | CCE (5, 18) |
| CCE (1, 19) | CCE (2, 19) | CCE (3, 19) | CCE (4, 19) | CCE (5, 19) |
| CCE (1, 20) | CCE (2, 20) | CCE (3, 20) | CCE (4, 20) | CCE (5, 20) |

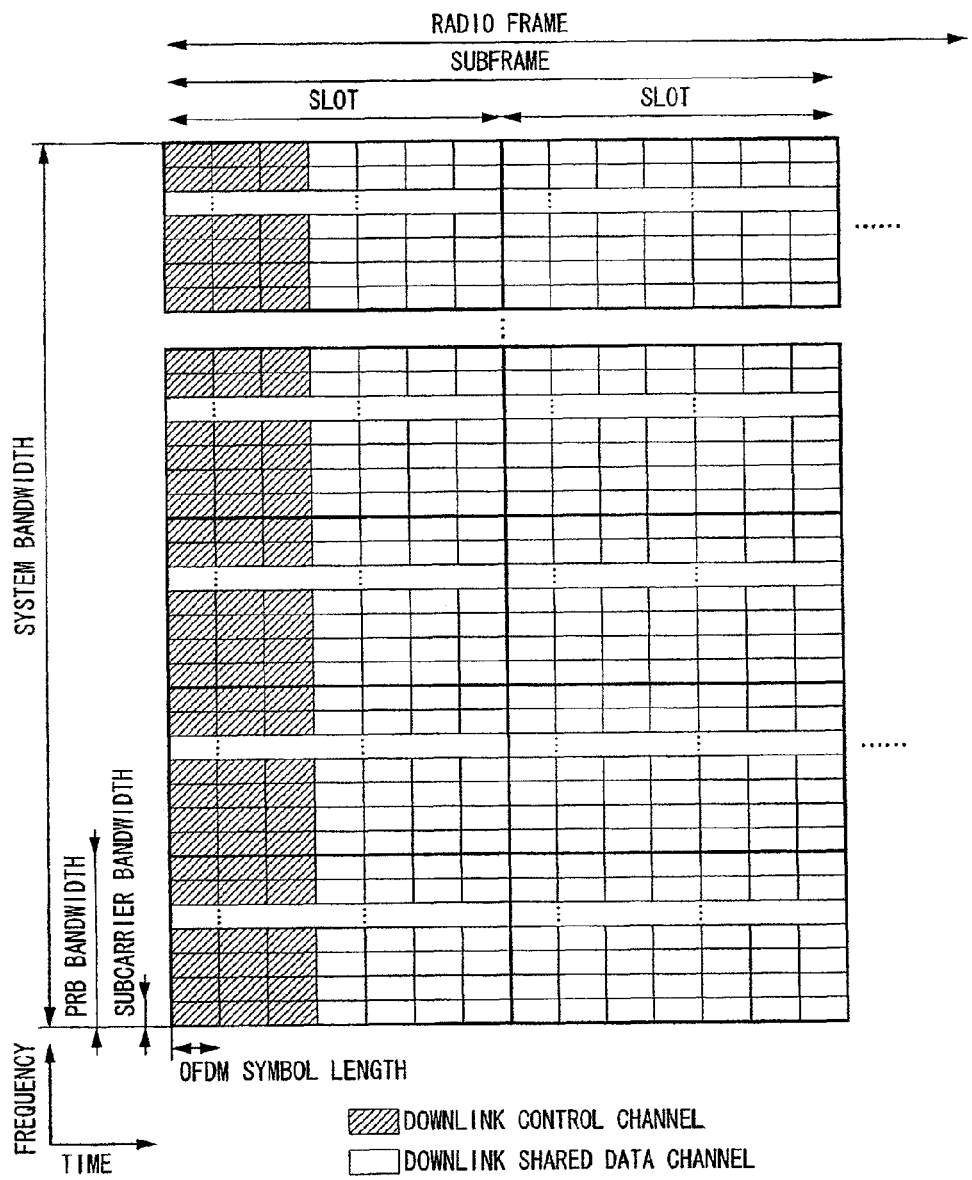

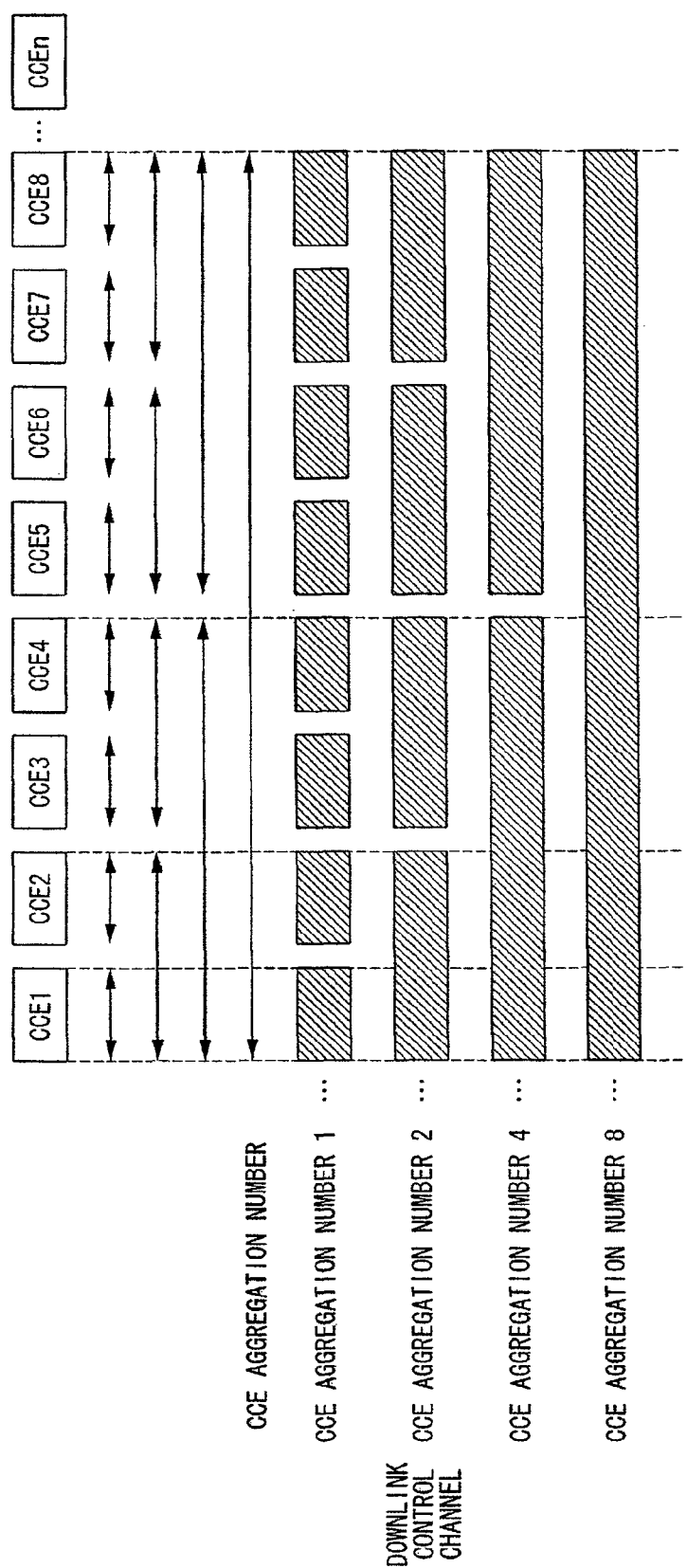

US 9,479,968 B2

WIRELESS COMMUNICATION SYSTEM, MOBILE STATION DEVICE, AND BASE STATION DEVICE

This application is a Continuation Application of co-pending application Ser. No. 13/125,352, filed on Apr. 21, 2011, for which priority is claimed under 35 U.S. C. §120, application Ser. No. 13/125,352 is the national phase of PCT International Application No. PCT/JP2009/004043 filed on Aug. 21, 2009 under 35 U.S.C. §371, which claims the benefit of priority of Japanese Patent Application No. 2008-278517 filed on Oct. 29, 2008. The entire contents of each of the above-identified applications are hereby incorporated by reference.

TECHNICAL FIELD

The present invention relates to a wireless communication system, a mobile station device, and a base station device.

This application claims priority to and the benefits of Japanese Patent Application No. 2008-278517 filed on Oct. 29, 2008, the disclosure of which is incorporated herein by reference.

BACKGROUND ART

Wideband code division multiple access (W-CDMA) schemes, which are third generation (3G) radio access schemes of cellular mobile communication, have been standardized in 3rd Generation Partnership Project (hereinafter, referred to as 3GPP), and cellular mobile communication services by the same scheme have been initiated. In 3GPP, the evolution of 3G (hereinafter, referred to as evolved universal terrestrial radio access (EUTRA)) and the evolution of a 3G network (hereinafter, referred to as evolved universal terrestrial radio access network (EUTRAN)) have been studied.

An orthogonal frequency division multiplexing (hereinafter, referred to as OFDM) scheme of multicarrier transmission is used in a downlink of transmission from a base station device of EUTRA to a mobile station device. A single-carrier communication scheme of a discrete Fourier transform (DFT)-spread OFDM scheme of single-carrier transmission is used in an uplink of transmission from a mobile station device of EUTRA to a base station device.

In 3GPP, a 4th generation (4G) radio access scheme of cellular mobile communication (advanced EUTRA (hereinafter, referred to as "A-EUTRA")) and a 4G network (advanced EUTRAN) has started to be studied.

In A-EUTRA, a study has been made to deal with a frequency band, which is wider than that of EUTRA, and to secure compatibility with EUTRA. A mobile station device corresponding to EUTRA, which communicates with a base station using part (hereinafter, referred to as a "subband") of a frequency band of the base station device, and a mobile station device corresponding to A-EUTRA, which communicates with a base station device using one or more subbands of the base station device, have been proposed. That is, the base station device, which controls transmission/reception of the mobile station device, performs transmission/reception to/from the mobile station device corresponding to EUTRA using any one subband, and perform is transmission/reception to/from the mobile station device corresponding to A-EUTRA using one or more subbands in response to capability of the mobile station device, which performs transmission/reception. That is, the base station device uses all subbands by allocating several resources (a resource block) of a subband to the mobile station device corresponding to EUTRA in each subband and allocating several separate resources, which are not yet allocated to the mobile station device corresponding to EUTRA, to the mobile station device corresponding to A-EUTRA. However, the number of resources to be allocated is changed in response to capability of the mobile station device corresponding to A-EUTRA since the number of subbands capable of being simultaneously transmitted and received is different even in the mobile station device corresponding to A-EUTRA.

A layered OFDM scheme, which uses OFDM of multi-carrier transmission in a downlink of transmission from a base station device to a mobile station device in A-EUTRA and performs communication using a plurality of frequency bands, has been proposed (see Non-Patent Document 1).

FIG. 15 is a diagram showing a schematic configuration of a downlink radio frame in EUTRA. In FIG. 15, the horizontal axis represents a frequency domain and the vertical axis represents a time domain. The downlink radio frame is a unit of radio resource allocation or the like, and includes physical resource block (hereinafter, referred to as "PRB") pairs including a frequency band and a time band having predetermined widths. One PRB pair includes 2 PRBs continuous in the time domain.

One PRB includes 12 subcarriers in the frequency domain and includes 7 OFDM symbols in the time domain. A system bandwidth is a communication bandwidth of the base station device. In the time domain, a slot includes 7 OFDM symbols, a subframe includes 2 slots, and a radio frame includes 10 subframes. A unit including 1 subcarrier and 1 OFDM symbol is referred to as a resource element. In a downlink radio frame, a plurality of PRBs are arranged in response to the system bandwidth.

In each subframe, at least a downlink shared data channel used in transmission of information data and a downlink control channel used in transmission of control data are arranged. Although not shown in FIG. 15, downlink pilot channels used in channel estimation of the downlink shared data channel and the downlink control channel are distributed and arranged in a plurality of resource elements. The case where the downlink control channel is arranged in first, second, and third OFDM symbols of the subframe, and the downlink shared data channel is arranged in other OFDM symbols is shown in FIG. 15, but the OFDM symbols in which the downlink control channel is arranged may vary in a subframe unit.

Although not shown in FIG. 15, a control format indicator channel indicating the number of OFDM symbols constituting the downlink control channel is arranged in the first OFDM symbol. The downlink control channel may be arranged in only the first OFDM symbol or may be arranged in the first and second OFDM symbols. In the same OFDM symbol, the downlink control channel and the downlink shared data channel are not arranged together. In the downlink control channel, a mobile station ID, radio resource allocation information of the downlink shared data channel, multi-antenna-related information, a modulation scheme, a coding rate, a retransmission parameter, and the like are arranged.

The downlink control channel is constituted by one or more control channel elements (CCEs). The number of CCEs depends upon the system bandwidth, the number of OFDM symbols constituting the downlink control channel, and the number of downlink pilot channels corresponding to the number of transmission antennas of the base station device used in communication. The CCE is constituted by a plurality of resource elements.

FIG. 16 is a diagram illustrating a logical relationship between the CCEs and the downlink control channel in EUTRA. Here, CCE n indicates a CCE of CCE index n. The CCE index is a CCE identification number.

The downlink control channel is constituted by an aggregation including one or more CCEs. The number of CCEs constituting the aggregation is hereinafter referred to as a "CCE aggregation number." The CCE aggregation number constituting the downlink control channel is determined in response to a coding rate and an amount of control data. An aggregation including n CCEs is hereinafter referred to as "CCE aggregation n." For example, the downlink control channel is constituted by 1 CCE (CCE aggregation 1), the downlink control channel is constituted by 2 CCEs (CCE aggregation 2), the downlink control channel is constituted by 4 CCEs (CCE aggregation 4), or the downlink control channel is constituted by 8 CCEs (CCE aggregation 8).

The CCE is constituted by a plurality of resource element groups (also referred to as mini-CCEs). FIG. 17 is a diagram illustrating an arrangement example of resource element groups in a downlink subframe by EUTRA. Here, the case where the downlink control channel is constituted by first to third OFDM symbols and downlink pilot channels of 2 transmission antennas (transmission antenna 1 and transmission antenna 2) are arranged is shown. In FIG. 17, the horizontal axis represents a frequency domain and the vertical axis represents a time domain. In the arrangement example of FIG. 17, 1 resource element group is constituted by 4 resource elements and is constituted by adjacent resource elements of the frequency domain.

If resource elements are denoted by the same reference numeral as that of the downlink control channel in FIG. 17, it indicates that the resource elements belong to the same resource element group. A resource element group is configured by skipping a resource element R1 (a downlink pilot channel to be transmitted from transmission antenna 1) and a resource element R2 (a downlink pilot channel to be transmitted from transmission antenna 2) in which the downlink pilot channels are arranged.

In FIG. 17, numbering (reference numeral "1") is performed from a resource element group of a first OFDM symbol having a lowest frequency. Next, a resource element group of a second OFDM symbol having a lowest frequency is numbered (reference numeral "2"). Next, a resource element group of a third OFDM symbol having a lowest frequency is numbered (reference numeral "3").

Next, a resource element group is numbered (reference numeral "4") adjacent in the frequency axis to the resource element group (reference numeral "2") in which the second OFDM symbol in which no downlink pilot channel is arranged is numbered. Next, a resource element group is numbered (reference numeral "5") adjacent in the frequency axis to the resource element group (reference numeral "3") in which the third OFDM symbol in which no downlink pilot channel is arranged is numbered.

Next, a resource element group is numbered (reference numeral "6") adjacent in the frequency axis to the resource element group (reference numeral "1") in which the first OFDM symbol is numbered. Next, a resource element group is numbered (reference numeral "7") adjacent in the frequency axis to the resource element group (reference numeral "2") in which the second OFDM symbol is numbered. Next, a resource element group is numbered (reference numeral "8") adjacent in the frequency axis to the resource element group (reference numeral "3") in which the third OFDM symbol is numbered. Likewise, resource element groups of subsequent PRB pairs are also numbered.

The CCE is constituted by a plurality of resource element groups constituted as shown in FIG. 17. For example, 1 CCE is constituted by 9 different resource element groups distributed in the frequency domain and the time domain. Specifically, all resource element groups numbered as shown in FIG. 17 in the entire system bandwidth are interleaved using a block interleaver in a resource element group unit, and 1 CCE is constituted by 9 resource element groups whose numbers are continuous after interleaving.

The mobile station device demodulates and decodes a reception signal under assumption of a plurality of downlink control channels capable of being allocated to its own mobile station device for CCEs received in each subframe, and performs a cyclic redundancy check (hereinafter, referred to as "CRC") of checking whether or not it is a downlink control channel allocated to its own mobile station device using a CRC code added to the downlink control channel. Specifically, the base station device generates the CRC code from control data using a predetermined generating polynomial, adds information (CRC masked by UE ID) obtained by an exclusive OR operation of the generated CRC code and a mobile station ID of the mobile station device to which a downlink control channel is allocated to the downlink control channel, multiplexes the downlink control channel into a CCE, and transmits the CCE. By performing the inverse processing of the above-described operation, the mobile station device receiving the CCE from the base station device performs error detection and also detects whether or not a downlink control channel addressed to its own mobile station device is multiplexed and transmitted.

For example, in the case of a downlink control channel as shown in FIG. 16, a reception signal is demodulated, decoded, and CRC-checked for a total of 15 CCE combinations of 8 CCE aggregations 1, 4 CCE aggregations 2, 2 CCE aggregations 4, and 1 CCE aggregation 8 in terms of CCEs 1 to 8 under the assumption that the downlink control channel is multiplexed and transmitted. This processing is referred to as blind decoding of the downlink control channel, and the number of times of blind decoding is increased with an increase of the number of possible CCEs.

Here, a modulation scheme of the downlink control channel is fixed and several candidates for a coding rate are set for each CCE aggregation number. Accordingly, when the blind decoding is performed, decoding and a CRC check are performed at each candidate coding rate corresponding to a CCE aggregation number for each CCE combination. That is, if the number of candidate coding rates corresponding to a CCE aggregation number of a certain CCE combination is 2, decoding and a CRC check are performed for the CCE combination using each of the 2 coding rates, so that decoding and a CRC check are performed in two ways for the CCE combination. At this time, the coding rate varies with an amount of control data to be transmitted on the downlink control channel. Since the coding rate is determined by the CCE aggregation number if the amount of control data of the downlink control channel is fixed, decoding and a CRC check are performed in one way for each CCE combination. When the system bandwidth is wide, the number of CCEs is increased, the number of times of blind decoding of the downlink control channel is increased, and the processing load of the mobile station device is increased.

Thus, a method of reducing the number of times of blind decoding is used. Each mobile station device sets a CCE for which the downlink control channel is decoded. Specifically, the mobile station device sets a CCE number (hereinafter, referred to as a "starting point index") from which the downlink control channel starts to be decoded for each CCE aggregation number by a hash function having an input of a mobile station ID. The mobile station device decodes the downlink control channel using a plurality of CCEs from the set starting point index (hereinafter, a space including a plurality of CCEs for which the mobile station device determines the downlink control channel is referred to as a "mobile station-specific search space (UE-specific search space)").

The base station device recognizes a mobile station ID of the mobile station device to which the downlink control channel is allocated, multiplexes the downlink control channel including control data specific to the mobile station device into a CCE within a mobile station-specific space determined in response to the mobile station ID, and transmits the CCE to the mobile station device. As described above, a method of reducing the number of times of decoding the downlink control channel in the mobile station device is used by limiting the CCE for which the mobile station device decodes the downlink control channel.

In A-EUTRA, a study has been made to deal with a frequency band, which is wider than that of EUTRA, and to secure compatibility with EUTRA. For example, a wireless communication system including a plurality of frequency bands (a plurality of subbands) by designating a frequency bandwidth of EUTRA as one unit (subband) has been studied.

In A-EUTRA, which is a wireless communication system including a plurality of subbands, a plurality of methods for radio resource allocation information indicating radio resource allocation of a downlink shared data channel included in a downlink control channel have been studied (see Non-Patent Document 2).

For example, a method using the same radio resource allocation information as that of EUTRA has been studied (hereinafter, this method is referred to as "radio resource allocation method 1"). In radio resource allocation method 1, radio resource allocation information included in the downlink control channel corresponds to only within a subband in which the downlink control channel is arranged and indicates which PRB pair is allocated to the downlink shared data channel of the mobile station device to which the downlink control channel is allocated within a subband in which the downlink control channel is arranged. Radio resource allocation method 1 can reduce design and operation test loads of the mobile station device since the same radio resource allocation information as that of EUTRA is used.

Another method of adding subband information to radio resource allocation information of EUTRA has been studied (hereinafter, this method is referred to as "radio resource allocation method 2"). In radio resource allocation method 2, radio resource allocation information included in the downlink control channel is constituted by information indicating which PRB pair within a single subband is allocated to the downlink shared data channel of the mobile station device to which the downlink control channel is allocated and information indicating which subband corresponds to the PRB pair.

Since radio resource allocation method 2 requires a new control data format including subband information as compared to radio resource allocation method 1, design and operation test loads of the mobile station device are slightly increased. However, it is possible to increase a degree of freedom of scheduling of the base station device since a PRB pair of the downlink shared data channel indicated by the radio resource allocation information of the downlink control channel is not limited to a subband in which the downlink control channel is arranged.

Non-Patent Document 1: 3GPP TSG RAN1 #53, Kansas City, USA, 5-9 May, 2008, R1-081948 "Proposals for LTE-Advanced Technologies"

Non-Patent Document 2: 3GPP TSG RAN1 #53 bis, Warsaw, Poland, Jun. 30-Jul. 4, 2008, R1-082468 "Carrier aggregation in LTE-Advanced"

DISCLOSURE OF INVENTION

Problem to be Solved by the Invention

However, if the base station in which radio resource allocation method 1 or 2 is applied to A-EUTRA simultaneously allocates PRB pairs of a plurality of subbands to a downlink shared data channel of 1 mobile station device using radio resource allocation method 1 or 2, it is necessary to use a plurality of downlink control channels including mobile station device-specific control data. For example, it is necessary to simultaneously allocate a large number of PRB pairs to a mobile station device for which high-speed, large-volume data communication is necessary.

If the base station device simultaneously allocates PRB pairs to one mobile station device over a plurality of subbands using radio resource allocation method 1 or 2, it is necessary to use a plurality of downlink control channels.

High-speed, large-volume data communication may be performed using a plurality of downlink control channels as described above. Accordingly, it is necessary to detect a large number of downlink control channels addressed to its own mobile station device. A large number of detected downlink control channels are combined and decoded. This means that the mobile station device should perform blind decoding a large number of times. There is a problem in that processing of blind decoding a large number of times results in an increase of the processing load of the mobile station device.

Means for Solving the Problem

A wireless communication system according to an aspect of the present invention includes a plurality of mobile station devices and a base station device that transmits a transmission signal, including a control channel in which one or more control channel elements respectively including a plurality of time/frequency resources are included, to the mobile station devices, wherein the base station device includes: a control information generating section which generates control information specific to the mobile station devices; a control information count indicator generating section which generates a control information count indicator indicating the number of pieces of control information of each mobile station device generated by the control information generating section for each mobile station device; and a transmitting section which transmits the control information count indicator generated by the control information count indicator generating section to the mobile station device using one or more control channel elements, and transmits one or more pieces of control information generated by the control information generating section to the mobile station device using one or more control channels, and the mobile station device includes: a receiving section which receives a control information count indicator and control information transmitted from the base station device within a mobile station-specific search space selected based on a mobile station ID of the mobile station device; a control information count indicator detecting section which detects the control information indicator received by the receiving section; and a control channel decoding section which decodes the control channel in response to the number of pieces of control information detected by the control information count indicator detecting section.

In the aspect of the present invention, the control channel decoding section may check the control information count indicator detected by the control information count indicator detecting section, may decode the control channel until control information pieces of the mobile station device whose number is indicated are detected if the control information count indicator indicates the number of pieces of control information that is one or more, and may not decode the control channel if the control information count indicator is absent or if the control information specific to the mobile station device is absent.

In the aspect of the present invention, the control information count indicator may indicate the number of pieces of control information specific to the mobile station device in a time domain frame in which the control information count indicator is arranged.

In the aspect of the present invention, the control channel may be arranged in a control channel element subsequent to a control channel element in which the control information count indicator is arranged for control channel elements of a predetermined order.

In the aspect of the present invention, the control channel decoding section may control the number of control channel elements of the mobile station-specific search space for which the control channel is decoded in response to the number of pieces of control information detected by the control information count indicator detecting section.

In the aspect of the present invention, the control information count indicator may be preferentially arranged in the control channel element first searched for within the mobile station-specific search space selected based on the mobile station ID.

In the aspect of the present invention, the control information count indicator may be arranged in a predetermined number of control channel elements; and the control information count indicator detecting section may detect the control information count indicator in a unit of the predetermined number of control channel elements.

In the aspect of the present invention, the control information count indicator may further include control information specific to the mobile station device and includes the number of control channel elements constituting one or more control channels; and the control channel decoding section may check the number of control channel elements indicated in the control information count indicator and may decode the control channel until control information pieces whose number is indicated in the control information count indicator are detected for one or more control channels constituted by control channel elements whose number is indicated in the control information count indicator.

In the aspect of the present invention, the base station device may configure a plurality of frequency bands from a plurality of continuous subcarriers, configures a control channel element from a plurality of time/frequency resources of a frequency band, and configures a control channel from one or more control channel elements; the control information count indicator may indicate the number of pieces of control information specific to the mobile station device for each frequency band; and the control channel decoding section may decode control channels whose number corresponds to the number of pieces of control information detected by the control information count indicator detecting section for each frequency band.

In the aspect of the present invention, a mobile station device, which receives a transmission signal, includes a control channel in which one or more control channel elements respectively including a plurality of time/frequency resources are included, transmitted from a base station, the mobile station device including: a receiving section which receives a transmission signal including the control channel transmitted from the base station device within a mobile station-specific search space selected based on a mobile station ID of the mobile station device; a control information count indicator detecting section which detects the control information indicator indicating the number of pieces of control information specific to the mobile station device received by the receiving section; and a control channel decoding section which decodes the control channel in response to the number of pieces of control information detected by the control information count indicator detecting section.

In the aspect of the present invention, the control channel decoding section may check the control information count indicator detected by the control information count indicator detecting section, may decode the control channel until control information pieces of the mobile station device whose number is indicated are detected if the control information count indicator indicates the number of pieces of control information that is one or more, and may not decode the control channel if the control information count indicator is absent or if the control information specific to the mobile station device is absent.

In the aspect of the present invention, the control information count indicator may indicate the number of pieces of control information specific to the mobile station device in a time domain frame in which the control information count indicator is arranged; and the control channel decoding section may decode the control channel in response to the number of pieces of control information detected by the control information count indicator detecting section.

In the aspect of the present invention, the control channel may be arranged in a control channel element subsequent to a control channel element in which the control information count indicator is arranged for control channel elements of a predetermined order; and the control channel decoding section may decode the control channel in response to the number of pieces of control information detected by the control information count indicator detecting section.

In the aspect of the present invention, the control channel decoding section may control the number of control channel elements for which the control channel is decoded in response to the number of pieces of control information detected by the control information count indicator detecting section.

In the aspect of the present invention, the control information count indicator may be preferentially arranged in the control channel element first searched for within the mobile station-specific search space selected based on the mobile station ID; and the control channel decoding section may decode the control channel in response to the number of pieces of control information detected by the control information count indicator detecting section.

In the aspect of the present invention, the control information count indicator may be arranged in a predetermined number of control channel elements; and the control information count indicator detecting section may detect the control information count indicator in a unit of the predetermined number of control channel elements.

In the aspect of the present invention, the control information count indicator may further include control information specific to the mobile station device and include the number of control channel elements constituting one or more control channels; and the control channel decoding section may check the number of control channel elements indicated in the control information count indicator and decode the control channel until control information pieces whose number is indicated in the control information count indicator are detected for one or more control channels constituted by control channel elements whose number is indicated in the control information count indicator.

In the aspect of the present invention, in the mobile station device that receives a transmission signal including the control channel transmitted from the base station device, which configures a plurality of frequency bands from a plurality of continuous subcarriers, configures a control channel element from a plurality of time/frequency resources of a frequency band, and configures a control channel from one or more control channel elements, the control information count indicator may indicate the number of pieces of control information specific to the mobile station device for each frequency band; and the control channel decoding section may decode control channels whose number corresponds to the number of pieces of control information detected by the control information count indicator detecting section for each frequency band.

A base station device according to still another aspect of the present invention that transmits a transmission signal, includes a control channel in which one or more control channel elements respectively including a plurality of time/frequency resources are included, to mobile station devices, the base station device including: a control information generating section which generates control information specific to the mobile station devices; a control information count indicator generating section which generates a control information count indicator indicating the number of pieces of control information of each mobile station device generated by the control information generating section for each mobile station device; and a transmitting section which transmits the control information count indicator generated by the control information count indicator generating section to the mobile station device using one or more control channel elements, and transmits one or more pieces of control information generated by the control information generating section to the mobile station device using one or more control channels.

Effect of the Invention

According to the present invention, there is an advantageous effect in that a processing load of decoding to be performed by a mobile station device to detect a plurality of downlink control channels is reduced in a situation where the plurality of downlink control channels are allocated to one mobile station device so as to perform high-speed, large-volume data communication.

BRIEF DESCRIPTION OF THE DRAWINGS

FIG. 3 is a diagram illustrating an arrangement example of a resource element group in a downlink subframe of this embodiment FIG. 4 is a diagram illustrating numbering of CCEs within a system band according to a first embodiment of the present invention.

FIG. 5D is a diagram illustrating a radio resource allocation method of a downlink shared data channel according to the first embodiment of the present invention.

FIG. 14 is a diagram illustrating numbering of CCEs within a system band according to the second embodiment of the present invention.

FIG. 15 is a diagram showing a schematic configuration of a downlink radio frame in EUTRA.

FIG. 16 is a diagram illustrating a logical relationship between CCEs and a downlink control channel in EUTRA.

BRIEF DESCRIPTION OF THE DRAWINGS

A plurality of embodiments of the present invention will now be described with reference to the drawings. In this embodiment, a wireless communication system includes a base station device 1 and a plurality of mobile station devices 2. The mobile station devices 2 include both a mobile station device corresponding to A-EUTRA and a mobile station device corresponding to only EUTRA.

Figure 1:
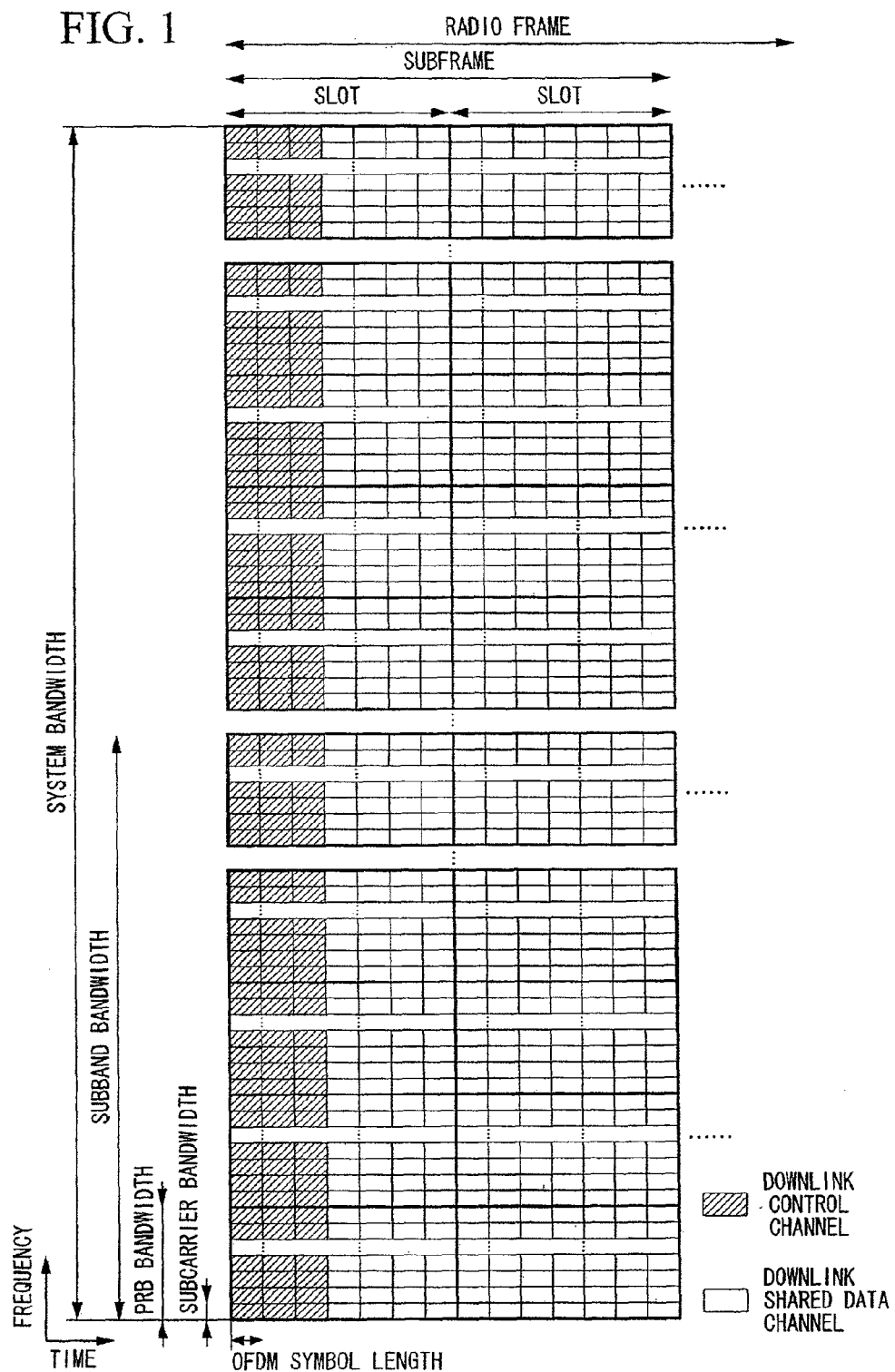
FIG. 1 is a diagram showing a schematic configuration of a radio frame of a downlink radio frame according to an embodiment of the present invention.

FIG. 1 is a diagram showing a schematic configuration of a downlink radio frame of a link from a base station device 1 to a mobile station device 2 according to the present embodiment. In FIG. 1, the horizontal axis represents a frequency domain and the vertical axis represents a time domain. The downlink radio frame includes PRB pairs including a frequency band and a time band having predetermined widths, and one PRB pair includes 2 PRBs continuous in the time domain.

One PRB includes 12 subcarriers in the frequency domain and includes 7 OFDM symbols in the time domain. A system bandwidth is a communication bandwidth of a base station device 1, and includes a plurality of subband bandwidths. For example, 1 subband includes 100 PRBs. In the time domain, a slot includes 7 OFDM symbols, a subframe includes 2 slots, and a radio frame includes 10 subframes. A unit including 1 subcarrier and 1 OFDM symbol is referred to as a resource element. In a downlink radio frame, a plurality of PRBs are arranged in response to the system bandwidth.

In each subframe, at least a downlink shared data channel used in transmission of information data and a downlink control channel used in transmission of control data (control information) are arranged. Although not shown in FIG. 1, downlink pilot channels used in channel estimation of the downlink shared data channel and the downlink control channel are distributed and arranged in a plurality of resource elements. The case where the downlink control channel is arranged in first, second, and third OFDM symbols of the subframe, and the downlink shared data channel is arranged in other OFDM symbols is shown in FIG. 1, but the OFDM symbols in which the downlink control channel is arranged can vary in a subframe unit.

Although not shown in FIG. 1, a control format indicator channel indicating the number of OFDM symbols constituting the downlink control channel is arranged in a first OFDM symbol. In FIG. 1, the downlink control channel is arranged in the first, second, and third OFDM symbols. The downlink control channel may be arranged in only the first OFDM symbol or may be arranged in first and second OFDM symbols. In the same OFDM symbol, the downlink control channel and the downlink shared data channel are not arranged together. In the downlink control channel, a mobile station ID, radio resource allocation information of the downlink shared data channel, multi-antenna-related information, a modulation scheme, a coding rate, a retransmission parameter, and the like are arranged.

Figure 2:
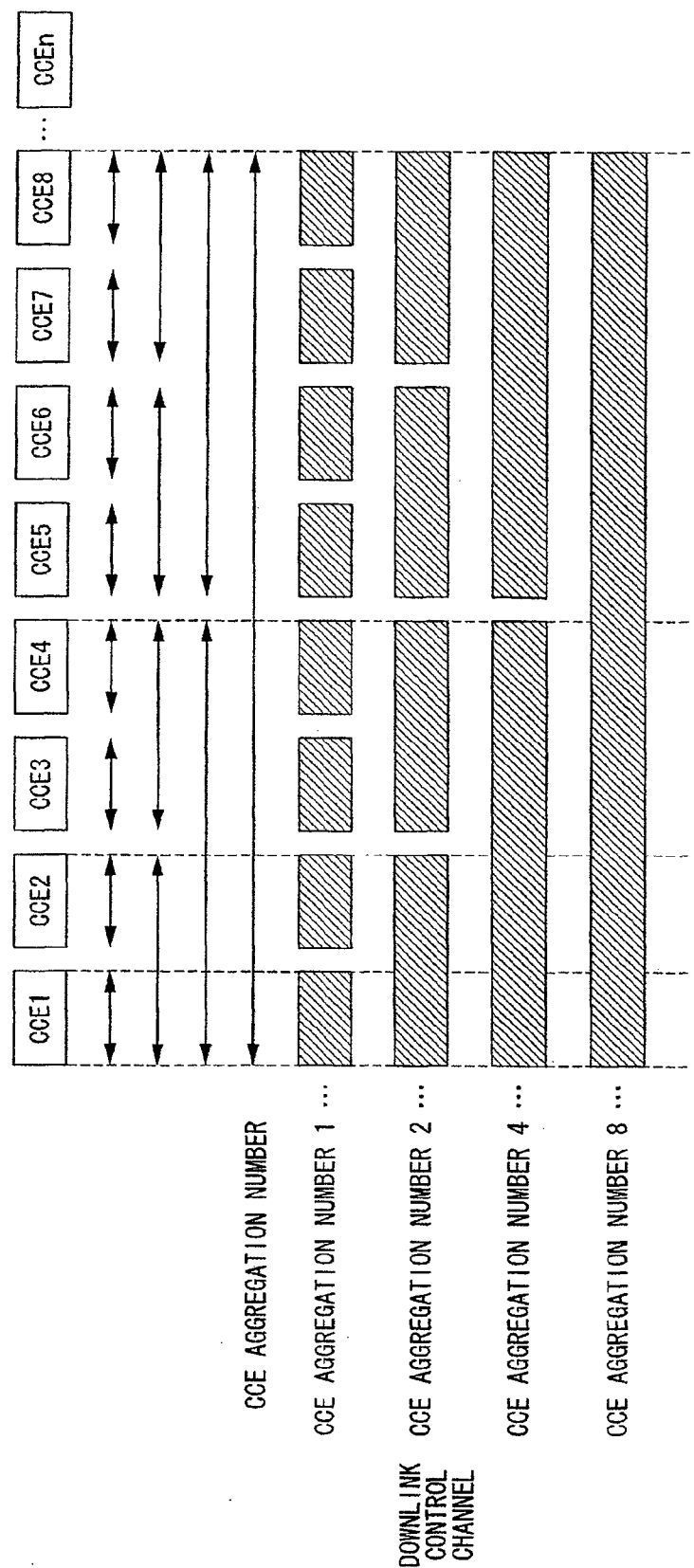
FIG. 2 is a diagram illustrating a logical relationship between CCEs and a downlink control channel of this embodiment.

The downlink control channel is constituted by one or more CCEs (Control Channel Elements). The CCE is constituted by a plurality of resource elements. FIG. 2 is a diagram illustrating a logical relationship between CCEs and a downlink control channel of the wireless communication system of the present invention. Here, CCE n indicates a CCE of CCE index n. The CCE index is a CCE identification number.

The downlink control channel is constituted by an aggregation including one or more CCEs. A CCE aggregation indicating the number of CCEs constituting the downlink control channel is determined in response to a coding rate and an amount of control data. For example, CCE aggregation n including n CCEs can constitute the downlink control channel by 1 CCE (CCE aggregation 1), can constitute the downlink control channel by 2 CCEs (CCE aggregation 2), can constitute the downlink control channel by 4 CCEs (CCE aggregation 4), or can constitute the downlink control channel by 8 CCEs (CCE aggregation 8).

In this embodiment, the CCE is constituted by a plurality of resource element groups (also referred to as mini-CCEs) of the same subband. FIG. 3 is a diagram illustrating an arrangement example of resource element groups in a downlink subframe according to this embodiment. In FIG. 3, the horizontal axis represents a frequency domain and the vertical axis represents a time domain. In the arrangement example of FIG. 3, an example in which 1 resource element group is constituted by 4 resource elements and is constituted by adjacent resource elements of the frequency domain when the downlink control channel is constituted by first to third OFDM symbols and downlink pilot channels of 2 transmission antennas (transmission antenna 1 and transmission antenna 2) are arranged is shown.

If resource elements are denoted by the same reference numeral as the downlink control channel in FIG. 3, it indicates that the resource elements belong to the same resource element group. A resource element group is configured by skipping a resource element R1 (a downlink pilot channel to be transmitted from transmission antenna 1) and a resource element R2 (a downlink pilot channel to be transmitted from transmission antenna 2) in which the downlink pilot channels are arranged.

In FIG. 3, numbering (reference numeral "1") from a resource element group of a first OFDM symbol having a lowest frequency is performed. Next, a resource element group of a second OFDM symbol having a lowest frequency is numbered (reference numeral "2"). Next, a resource element group of a third OFDM symbol having a lowest frequency is numbered (reference numeral "3").

Next, a resource element group is numbered (reference numeral "4") adjacent in the frequency axis to the resource element group (reference numeral "2") in which the second OFDM symbol in which no downlink pilot channel is arranged is numbered. Next, a resource element group is numbered (reference numeral "5") adjacent in the frequency axis to the resource element group (reference numeral "3") in which the third OFDM symbol in which no downlink pilot channel is arranged is numbered.

Next, a resource element group is numbered (reference numeral "6") adjacent in the frequency axis to the resource element group (reference numeral "1") in which the first OFDM symbol is numbered. Next, a resource element group is numbered (reference numeral "7") adjacent in the frequency axis to the resource element group (reference numeral "2") in which the second OFDM symbol is numbered. Next, a resource element group is numbered (reference numeral "8") adjacent in the frequency axis to the resource element group (reference numeral "3") in which the third OFDM symbol is numbered. Likewise, resource element groups of subsequent PRB pairs are also numbered.

According to this embodiment, the CCE is constituted by a plurality of resource element groups of the same subband constituted as shown in FIG. 3. For example, 1 CCE is constituted by 9 different resource element groups distributed in the frequency domain and the time domain within the subband. Specifically, all resource element groups numbered as shown in FIG. 3 are interleaved using a block interleaver in a resource element group unit for the entire subband bandwidth for each subband, and 1 CCE is constituted by 9 resource element groups whose numbers are continuous after interleaving.

The number of resource element groups of the subband, that is, the number of CCEs, varies with a subband bandwidth, the number of downlink pilot channels corresponding to the number of transmission antennas of the base station device 1 for use in communication, and the number of OFDM symbols constituting the downlink control channel.

First Embodiment

FIG. 4 is a diagram illustrating numbering of CCEs within a system band according to the first embodiment of the present invention. FIG. 4 shows the case where 5 subbands are configured within the system band and 20 CCEs are configured in each subband. In the frequency domain of FIG. 4, it is assumed that the ascending order of frequency is subband 1<subband 2<subband 3<subband 4<subband 5.

First the base station device 1 interleaves resource elements by the above-described block interleaver in subband 1. The base station device 1 numbers CCEs respectively including 9 resource element groups as CCE 1, CCE 2, CCE 3, CCE 4, CCE 5, CCE 6, CCE 7, CCE 8, CCE 9, CCE 10, CCE 11, CCE 12, CCE 13, CCE 14, CCE 15, CCE 16, CCE 17, CCE 18, CCE 19, and CCE 20 in order of output from the block interleaver.

Subsequently, likewise, CCEs of subband 2 are also numbered as CCE 21 to CCE 40. Continuously, likewise, CCEs of subbands 3, 4, and 5 are also numbered.

Figure 5A:
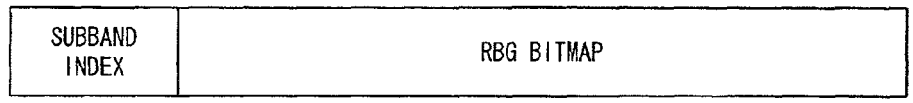
FIG. 5A is a diagram illustrating a radio resource allocation method of a downlink shared data channel according to the first embodiment of the present invention.

FIGS. 5A to 5D are diagrams illustrating a method of allocating radio resources of the downlink shared data channel in the first embodiment of the present invention. FIG. 5A is a diagram showing a configuration of radio resource allocation information. The radio resource allocation information includes subband indices indicating numbers of subbands in which radio resources of the downlink shared data channel are allocated and a resource block group (hereinafter, referred to as "RBG") bitmap indicating numbers of PRB pair groups within a subband in which radio resources of the downlink shared data channel are allocated.

Figure 5B:
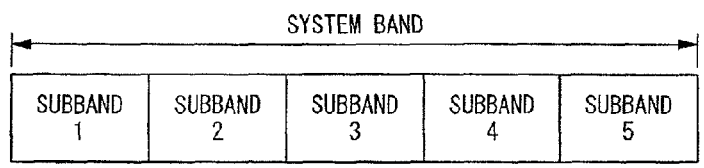
FIG. 5B is a diagram illustrating a radio resource allocation method of a downlink shared data channel according to the first embodiment of the present invention.

FIG. 5B is a diagram illustrating the subband indices of FIG. 5A. In FIG. 5B, the case where 5 subbands (subband 1 to subband 5) are configured within a system band is shown. The subband indices store numbers of subbands in which radio resources of the downlink shared data channel are allocated within the 5 subbands.

Figure 5C:
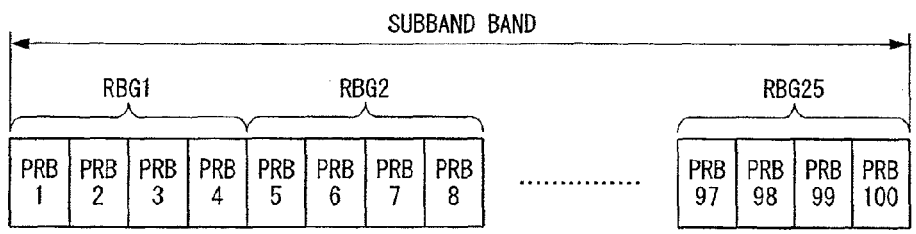
FIG. 5C is a diagram illustrating a radio resource allocation method of a downlink shared data channel according to the first embodiment of the present invention.

FIG. 5C is a diagram illustrating a configuration of an RBG. The RBG is constituted by a plurality of PRB pairs, and the number of PRB pairs constituting 1 RBG is set by the number of PRB pairs within a subband band. In FIG. 5C, the case where 100 PRB pairs are configured within 1 subband band and 1 RBG is constituted by 4 PRB pairs is shown. For simplicity of description, in FIG. 5C, only 1 PRB of a PRB pair is shown.

FIG. 5D is a diagram illustrating the RBG bitmap of FIG. 5A. In the RBG bitmap, 1 bit is configured for each RBG index, and a bit corresponding to an RBG index is pre-associated with a bit of a specific position within the RBG bitmap. Each bit indicates whether or not a corresponding RBG is allocated for the downlink shared data channel. For example, when a bit value is "0", it indicates that a corresponding RBG is not allocated. When a bit value is "1", it indicates that a corresponding RBG is allocated. The radio resource allocation information as described above is included in the downlink control channel.

Figure 6:
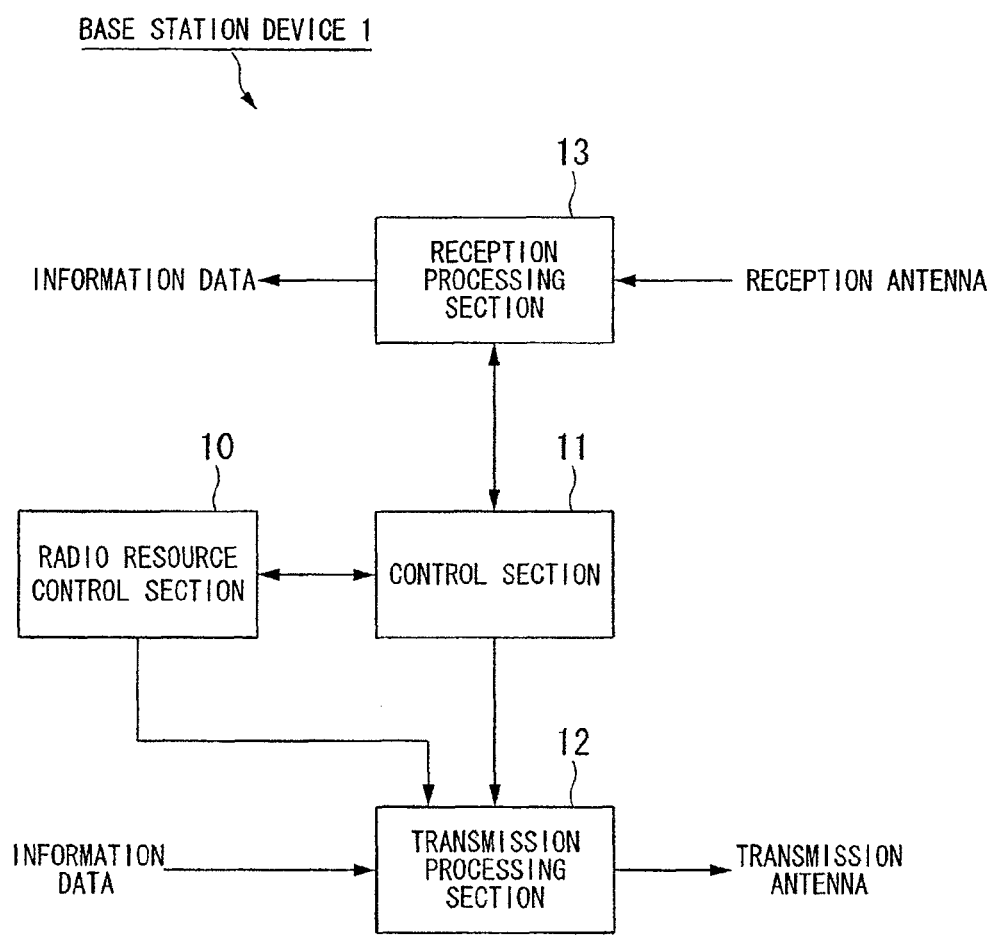
FIG. 6 is a schematic block diagram showing a configuration of a base station device according to the first embodiment.

FIG. 6 is a schematic block diagram showing a configuration of the base station device 1 according to the first embodiment of the present invention. As shown in FIG. 6, the base station device 1 has a radio resource control section 10, a control section 11, a transmission processing section 12, and a reception processing section 13.

The radio resource control section 10 manages radio resource control information including transmission power of each of the mobile station devices 2, an intermittent transmission/reception cycle, a transmission cycle of a channel quality indicator (CQI) signal, and modulation schemes/coding rates of a downlink shared data channel and an uplink shared data channel, and the like, and transmits the radio resource control information to the mobile station device 2 through the transmission processing section 12.

The radio resource control section 10 schedules radio resource allocation of a downlink control channel directed to the mobile station device 2, determines a coding rate of the downlink control channel, and outputs information including a mobile station ID of the mobile station device 2 to which radio resources are allocated to the transmission processing section 12 via the control section 11.

The control section 11 determines the number of CCEs (a CCE aggregation number) of one or more downlink control channels allocated to the mobile station device 2 based on information indicating coding rates of one or more downlink control channels input from the radio resource control section 10 for each mobile station device, and outputs related information to the transmission processing section 12 along with the mobile station ID of the mobile station device 2 to which one or more downlink control channels are allocated.

The control section 11 instructs the transmission processing section 12 to generate a control information count indicator indicating the number of control data (control information) (hereinafter, control data (control information) specific to the mobile station device 2 is referred to as "mobile station device-specific data") specific to the mobile station device 2 to which one or more downlink control channels are allocated.

The control section 11 generates mobile station device-specific data to be transmitted using one or more downlink control channels, and outputs the mobile station device-specific data to the transmission processing section 12.

The mobile station device-specific data to be transmitted on each downlink control channel includes a mobile station ID, radio resource allocation information of a downlink shared data channel, multi-antenna-related information, a modulation scheme, a coding rate, a retransmission parameter, information of a CRC (CRC masked by UE ID) code and the like. For the transmission processing section 12, the control section 11 controls radio resource allocation, a modulation scheme, and a coding rate of the downlink shared data channel based on information input from the radio resource control section 10.

The transmission processing section 12 generates and transmits one or more downlink control channels, a downlink shared data channel, and a control information count indicator based on control data including mobile station device-specific data input from the control section 11. The transmission processing section 12 sets a mobile station-specific search space of the mobile station device 2 to which one or more downlink control channels are allocated based on the mobile station ID, multiplexes a control information count indicator addressed to the mobile station device 2 into one or more CCEs within the mobile station-specific search space, multiplexes one or more other downlink control channels into one or more CCEs within the mobile station-specific search space, and transmits the CCEs. The number of CCEs to be used to multiplex the downlink control channel is based on information input from the control section 11. The transmission processing section 12 sets a mobile station-specific search space for each CCE aggregation number based on a mobile station ID and a hash function.

The reception processing section 13 extracts control data including mobile station device-specific data and information data by demodulating and decoding a reception signal received by a reception antenna from the mobile station device 2 according to an instruction of the control section 11. The reception processing section 13 outputs the control data including the mobile station device-specific data to the control section 11, and outputs the information data to a processing device of an upper layer (not shown).

Figure 7:
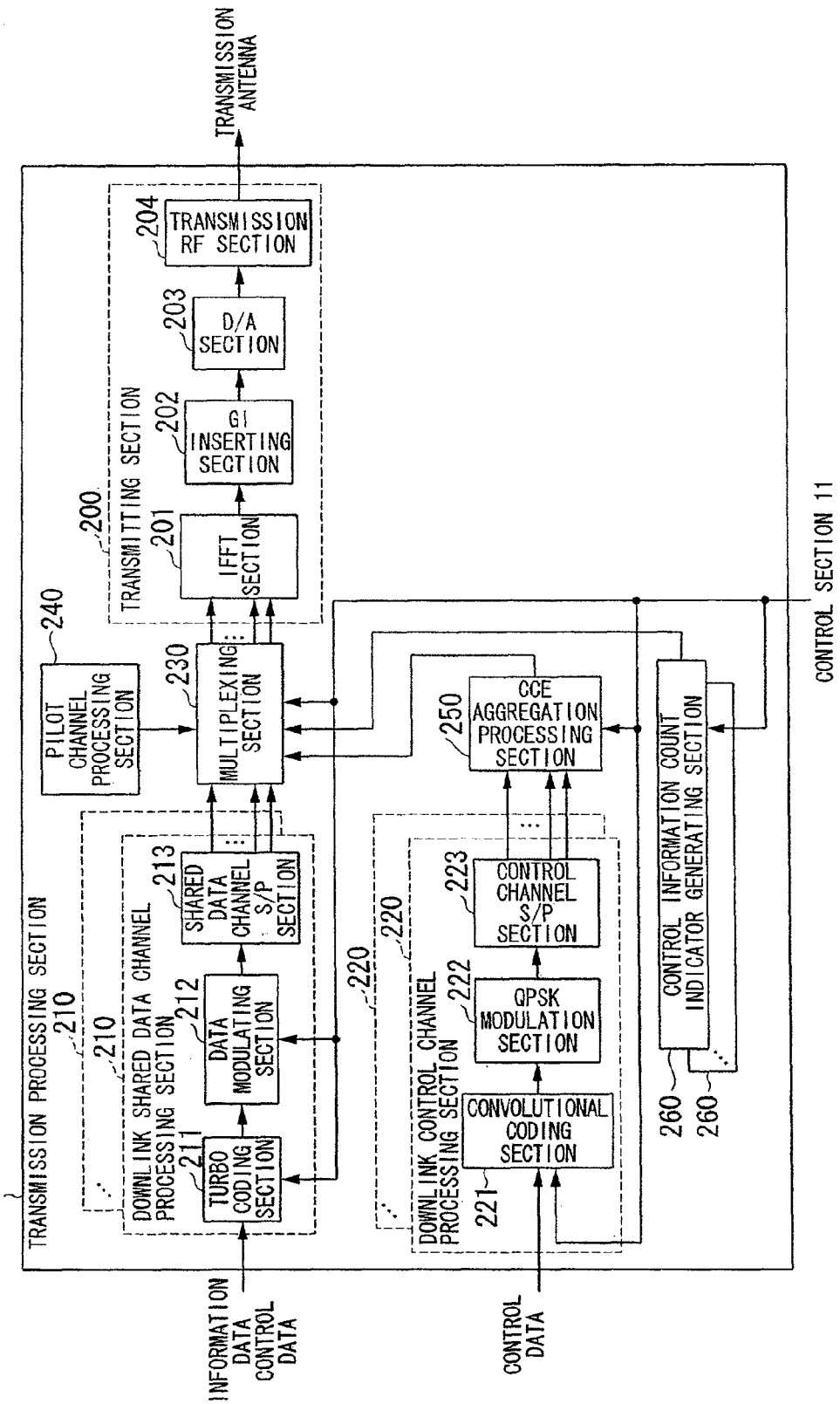
FIG. 7 is a schematic block diagram showing an internal configuration of a transmission processing section of a base station according to the first embodiment of the present invention.

FIG. 7 is a schematic block diagram showing an internal configuration of the transmission processing section 12 of the base station device 1 according to the first embodiment of the present invention. The transmission processing section 12 of the base station device 1 has a plurality of downlink shared data channel processing sections 210, a plurality of downlink control channel processing sections (control information generating sections) 220, a CCE aggregation processing section 250, a plurality of control information count indicator generating sections 260, a pilot channel processing section 240, a multiplexing section 230, an IFFT (Inverse Fast Fourier Transform) section 201, a GI (Guard Interval) inserting section 202, a D/A (Digital/Analog conversion) section 203, and a transmission RF (Radio Frequency) section 204. The IFFT section 201, the GI inserting section 202, the D/A section 203, and the transmission RF section 204 are collectively referred to as a transmitting section 200.

Since the plurality of downlink shared data channel processing sections 210, the plurality of downlink control channel processing sections 220, and the plurality of control information count indicator generating sections 260 have the same configuration and function as each other, one will be representatively described.

The downlink shared data channel processing section 210 has a turbo coding section 211, a data modulating section 212, and a shared data channel S/P (Serial/Parallel conversion) section 213. The downlink control channel processing section 220 has a convolutional coding section 221, a QPSK (Quadrature Phase Shift Keying) modulation section 222, and a control channel S/P section 223.

Each downlink shared data channel processing section 210 performs baseband processing for transmitting information data directed to each mobile station device 2 in an OFDM scheme. The downlink shared data channel processing section 210 also processes control data including information different from that of the downlink control channel processing section 220.

According to an instruction of a coding rate from the control section 11, the turbo coding section 211 performs turbo coding for improving error resilience of information data.

The data modulating section 212 outputs a modulation symbol signal sequence by modulating information data encoded by the turbo coding section 211 in a modulation scheme instructed from the control section 11 among modulation schemes such as QPSK, 16 quadrature amplitude modulation (16QAM), and 64 quadrature amplitude modulation (64QAM). The shared data channel S/P section 213 converts a serial signal sequence (stream) output by the data modulating section 212 into parallel signal sequences.

Each downlink control channel processing section 220 performs baseband processing for transmitting one or more mobile station device-specific data specific to the mobile station device 2 including information such as radio resource allocation information and a mobile station ID in the OFDM scheme.

The convolutional coding section 221 performs convolutional coding for improving error resilience of the mobile station device-specific data according to an instruction of a coding rate from the control section 11. Here, the mobile station device-specific data is expressed in a bit unit, and the convolutional coding section 221 also performs rate matching for adjusting the number of output bits for bits for which convolutional coding processing is performed.

The QPSK modulation section 222 outputs a modulation symbol signal sequence by modulating the encoded mobile station device-specific data in the QPSK modulation scheme.

The control channel S/P section 223 converts the serial signal sequence output by the QPSK modulation section 222 into parallel signal sequences.

The CCE aggregation processing section 250 performs rearrangement processing for multiplexing signals of the one or more downlink control channels output from the control channel S/P section 223 into CCEs according to an instruction of the number of CCEs designated from the control section 11. The multiplexing of the signals of the one or more downlink control channels into the CCEs will be described below in detail.

The CCE aggregation processing section 250 has a block interleaver, and interleaves downlink control channel signals, which are arranged in CCEs for each subband, in a resource element group unit. One CCE is constituted by 9 resource element groups for which interleaving is performed in the resource element group unit. Respective downlink control channel signals output by the control channel S/P sections 223 are distributed and multiplexed into a plurality of resource element groups in the multiplexing section 230 to be described later.

Each of the plurality of control information count indicator generating sections 260 generates a control information count indicator indicating the number of mobile station device-specific data of a plurality of mobile station devices, that is, the number of downlink control channels simultaneously allocated to 1 mobile station device 2. The control information count indicator has a different information amount from various control data formats constituting mobile station device-specific data in the downlink control channel.

The control information count indicator generating section 260 generates a CRC code using a predetermined generating polynomial for a bit sequence indicating the number of mobile station device-specific data, and performs convolutional coding for information (CRC masked by UE ID) taken by an exclusive OR operation of a mobile station ID of the mobile station device 2 for which the number of mobile station device-specific data is indicated using the control information count indicator and the generated CRC code and the above-described bit sequence, performs the QPSK modulation, and generates a signal of the control information count indicator. For CCEs designated from the control section 11, the signal of the control information count indicator is multiplexed into a plurality of resource element groups distributed in the multiplexing section 230 like the above-described CCE aggregation processing section 250.

The pilot channel processing section 240 generates a signal of a downlink pilot channel, which is a known signal in the mobile station device 2, and outputs the signal to the multiplexing section 230.

The multiplexing section 230 multiplexes a signal output by the pilot channel processing section 240, a signal output by the control information count indicator generating section 260, a signal output by the CCE aggregation processing section 250, and a signal output by the downlink shared data channel processing section 210 into a downlink radio frame based on allocation determined by the control section 11. At this time, the mobile station ID of the mobile station device 2 to which the control information count indicator, the downlink control channel, and the downlink shared data channel are allocated is referred to.

Multiplexing between the downlink shared data channel and the downlink control channel is performed by time multiplexing as shown in FIG. 1. Multiplexing between the downlink pilot channel and another channel is performed by time/frequency multiplexing. The control information count indicator and the downlink control channel are multiplexed by time/frequency multiplexing in a CCE unit. Details of processing of the multiplexing section 230 for multiplexing a control information count indicator and one or more downlink control channels allocated to the same mobile station device 2 into CCEs will be described in detail later.

The IFFT section 201 transforms a multiplexed signal from the multiplexing section 230 by an IFFT and modulates the IFFT signal in the OFDM scheme.

The GI inserting section 202 generates a digital baseband signal including a symbol of the OFDM scheme by adding a GI to the modulated signal of the OFDM scheme by the IFFT section 201. The GI is generated by reproducing part of a head or tail of a symbol to be transmitted.

The D/A section 203 converts the digital baseband signal input from the GI inserting section 202 into an analog signal.

The transmission RF section 204 generates an in-phase component and a quadrature component of an intermediate frequency from the input analog signal, removes an extra frequency component from an intermediate frequency band, converts (up-converts) an intermediate frequency signal into a high frequency signal, removes an extra frequency component, power-amplifies the high frequency signal, and transmits the signal via a transmission antenna.

That is, the transmitting section 200 including the IFFT section 201, the GI inserting section 202, the D/A section 203, and the RF section 204 transmits a control information count indicator and one or more downlink control channels multiplexed by the multiplexing section 230 into CCEs via the transmission antenna. Since the reception processing section 13 of the base station device 1 is not related to the present invention, detailed description thereof is omitted.

Figure 8:
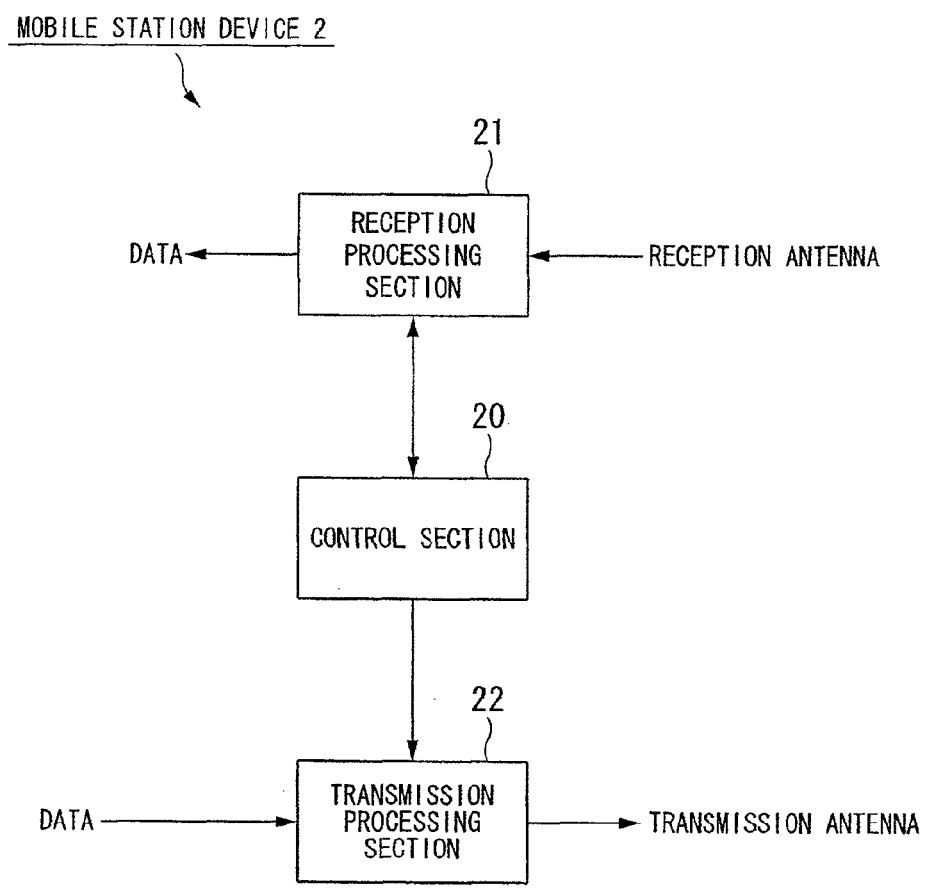
FIG. 8 is a schematic block diagram showing a configuration of a mobile station device according to the first embodiment of the present invention.

FIG. 8 is a schematic block diagram showing a configuration of the mobile station device 2 according to the first embodiment of the present invention. As shown in FIG. 8, the mobile station device 2 has a control section 20, a reception processing section 21, and a transmission processing section 22.

The reception processing section 21 receives a signal from the base station device 1, decodes the control information count indicator using a CCE within a mobile station-specific search space based on the mobile station ID of its own mobile station device 2 input from the control section 20, and detects the number of mobile station device-specific data addressed to its own mobile station device 2. If the control information count indicator indicating the number of mobile station device-specific data addressed to its own mobile station device 2 is detected, the downlink control channel is decoded using another CCE within the mobile station-specific search space, and downlink control channels addressed to its own mobile station device 2 whose number is indicated by the control information count indicator are detected. Details of the detection of the control information count indicator and the detection of the one or more downlink control channels will be described later.

If the one or more downlink control channels addressed to its own mobile station device 2 are detected, the reception processing section 21 outputs mobile station-specific data acquired from the one or more downlink control channels to the control section 20. The reception processing section 21 outputs information data acquired by decoding a downlink shared data channel addressed to its own mobile station device 2 to a processing device of an upper layer (not shown).

The control section 20 controls the transmission processing section 22 and the reception processing section 21 based on control data reported using the downlink control channel and the downlink shared data channel from the base station device 1. The control section 20 outputs a mobile station ID previously allocated from the base station device 1 to the reception processing section 21.

Specifically, at an initial communication connection time, the mobile station device 2 communicates with the base station device 1. During this procedure, the mobile station ID is reported from the base station device 1 to the mobile station device 2.

According to an instruction of the control section 20, the transmission processing section 22 encodes information data and control data and transmits a modulated signal to the base station device 1 via a transmission antenna.

Figure 9:
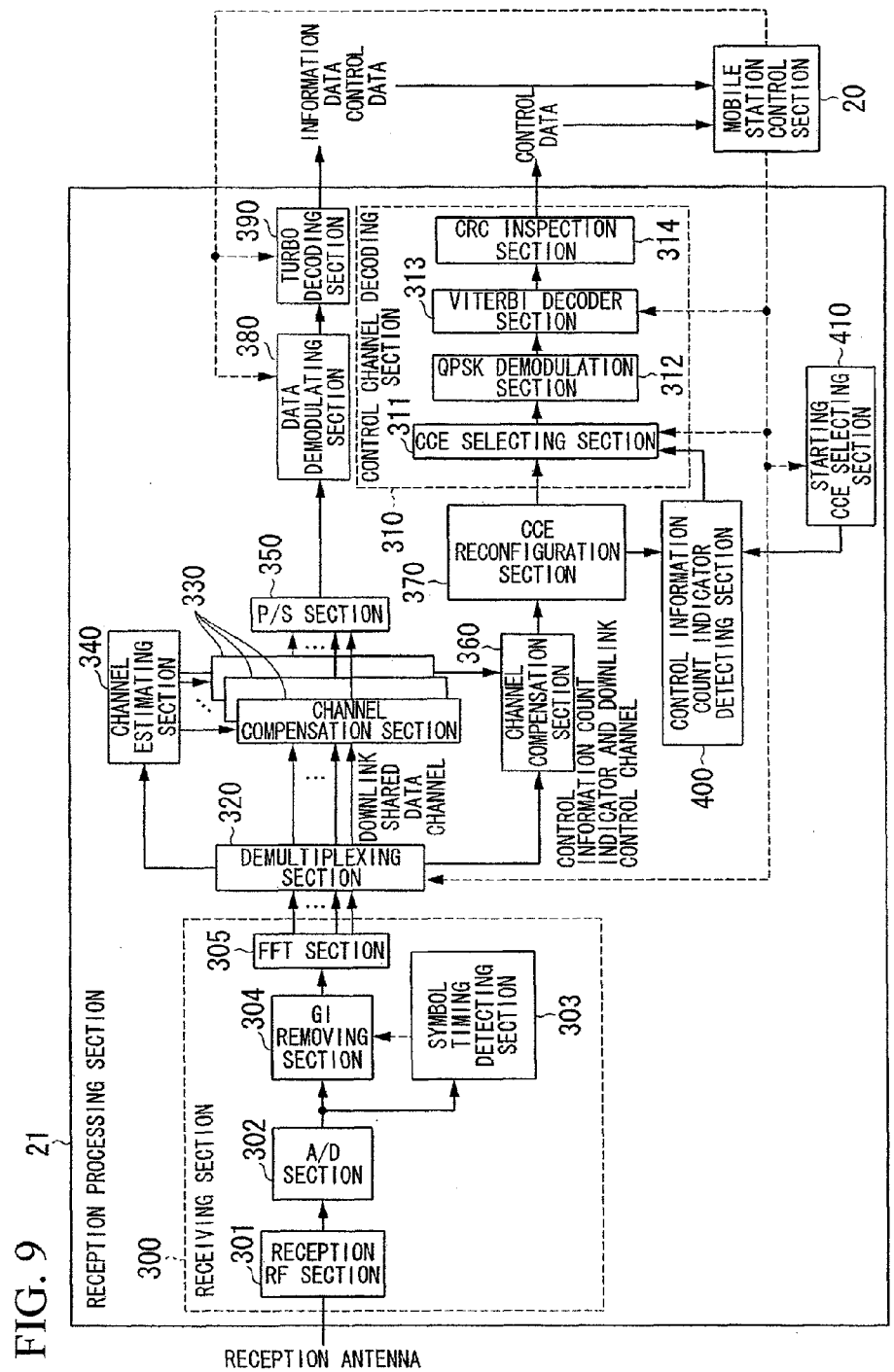
FIG. 9 is a schematic block diagram showing an internal configuration of a reception processing section of a mobile station according to the first embodiment of the present invention.

FIG. 9 is a schematic block diagram showing an internal configuration of the reception processing section 21 of the mobile station device 2 according to the first embodiment of the present invention. The reception processing section 21 of the mobile station device 2 has a reception RF section 301, an A/D (Analog/Digital conversion) section 302, a symbol timing detecting section 303, a GI removing section 304, an FFT section 305, a demultiplexing section 320, a channel estimating section 340, channel compensation sections 330 (for downlink shared data channels), a P/S (Parallel/Serial conversion) section 350, a data demodulating section 380, a turbo decoding section 390, a channel compensation section 360 (for a control information count indicator and a downlink control channel), a starting CCE selecting section 410, a CCE reconfiguration section 370, a control information count indicator detecting section 400, a CCE selecting section 311, a QPSK demodulation section 312, a Viterbi decoder section 313, and a CRC inspection section 314. The CCE selecting section 311, the QPSK demodulation section 312, the Viterbi decoder section 313, and the CRC inspection section 314 are collectively referred to as a control channel decoding section 310. The reception RF section 301, the A/D section 302, the GI removing section 304, the FFT section 305, and the symbol timing detecting section 303 are collectively referred to as a receiving section 300.

The reception RF section 301 appropriately amplifies a signal received by the reception antenna, converts (down-converts) the amplified signal into an intermediate frequency, removes an unnecessary frequency component, controls an amplification level to appropriately maintain a signal level, and performs quadrature demodulation based on an in-phase component and a quadrature component of the received signal.

The A/D section 302 converts a quadrature-demodulated analog signal into a digital signal. The symbol timing detecting section 303 detects a timing of a symbol boundary based on the digital signal output by the A/D section 302, and outputs a control signal indicating the detected timing of the symbol boundary.

The GI removing section 304 removes a part corresponding to a GI from the digital signal output from the A/D section 302 based on the control signal from the symbol timing detecting section 303, and outputs the remaining signal. The FFT section 305 transforms the signal output from the GI removing section 304 by an FFT, and performs demodulation of the OFDM scheme.

That is, the receiving section 300 including the reception RF section 301, the A/D section 302, the GI removing section 304, the FFT section 305, and the symbol timing detecting section 303 receives a signal from the base station device 1 via the reception antenna.

Based on an instruction from the control section 20, the demultiplexing section 320 separates demodulated signals from the FFT section 305 into a signal of a time/frequency domain where a downlink control channel and a control information count indicator are arranged and a signal of a time/frequency domain where a downlink shared data channel is arranged, and outputs the signals to the channel compensation section 360 and the channel compensation section 330.

In detail, the demultiplexing section 320 outputs signals of resource elements (constituting CCEs) in which the control information count indicator and the downlink control channel are arranged to the channel compensation section 360, and outputs signals of resource elements in which the downlink shared data channel is arranged to the channel compensation section 330. Although not described here, the control section 20 controls the demultiplexing section 320 based on the number of OFDM symbols of the downlink control channel indicated in a received control format indicator channel. The control information count indicator and the downlink control channel are multiplexed into the same OFDM symbols.

The channel estimating section 340 estimates a channel state using a received reference signal (a downlink pilot channel) (not shown) and a specified value of a reference signal upon transmission (pre-reported to the mobile station device 2), and outputs a control signal for adjusting an amplitude and a phase so as to compensate for channel fluctuation. This control signal is output for each subcarrier. Although not shown, the demultiplexing section 320 separates resource elements in which the downlink pilot channel is arranged, and outputs the separated resource elements to the channel estimating section 340.

The channel compensation section 330 adjusts amplitudes and phases of signals of resource elements in which the downlink shared data channel separated by the demultiplexing section 320 is arranged for each subcarrier according to a control signal from the channel estimating section 340.

The P/S section 350 converts parallel signal sequences adjusted by the channel compensation section 330 into a serial signal sequence.

The data demodulating section 380 demodulates a signal of the downlink shared data channel converted by the P/S section 350. This demodulation corresponds to a modulation scheme used in the data modulating section 212 of the base station device 1. When a chase combining method is used as hybrid automatic repeat request (HARQ), the data demodulating section 380 combines an error-detected data channel with a retransmitted data channel.

The turbo decoding section 390 decodes information data from the downlink shared data channel demodulated by the data demodulating section 380. When an incremental redundancy method is used as HARQ, the turbo decoding section 390 decodes a combination of an error-detected downlink shared data channel and a retransmitted downlink shared data channel.

The channel compensation section 360 adjusts amplitudes and phases of signals of resource elements (CCEs) in which the control information count indicator and the downlink control channel separated by the demultiplexing section 320 are arranged according to information from the channel estimating section 340.

Based on a hash function having an input of a mobile station ID input from the control section 20, the starting CCE selecting section 410 selects a starting point index of a CCE in which the control information count indicator is started to be detected.

The starting CCE selecting section 410 outputs a starting point index of CCEs selected for each CCE aggregation number and a mobile station-specific search space determined in response to the mobile station ID to the control information count indicator detecting section 400.

The CCE reconfiguration section 370 includes a block deinterleaver, which performs the inverse processing of the interleaving processing that is performed by the block interleaver of the base station device 1, and performs interleaving in a resource element group unit within a selected subband. The CCE reconfiguration section 370 reconfigures 1 CCE from 9 resource element groups having continuous numbers for which deinterleaving is performed, and outputs all CCEs to the control information count indicator detecting section 400 and the CCE selecting section 311 in ascending order of numbers.

The control information count indicator detecting section 400 detects a control information count indicator in a CCE within a mobile station-specific search space based on the starting point index of CCEs input from the starting CCE selecting section 410 and the mobile station-specific search space for the CCEs input from the CCE reconfiguration section 370.

The control information count indicator detecting section 400 detects the control information count indicator in a CCE unit of a CCE aggregation number. The control information count indicator detecting section 400 performs QPSK modulation for signals arranged in the CCEs, and performs Viterbi decoding for the QPSK-modulated signals. The control information count indicator detecting section 400 performs the Viterbi decoding at a fixed coding rate for each CCE aggregation number.

Next, the control information count indicator detecting section 400 performs CRC (CRC masked by UE ID) check for a Viterbi-decoded bit sequence using the mobile station ID.

Next, if no error is detected by the CRC (CRC masked by UE ID) check, the control information count indicator detecting section 400 determines the number of mobile station device-specific data addressed to its own mobile station device 2 by checking a bit sequence from which a CRC code is removed. If a control information count indicator addressed to its own mobile station device 2 is detected, the control information count indicator detecting section 400 outputs a control signal of an instruction for starting processing to the CCE selecting section 311 along with a CCE number in which the control information count indicator is detected, information indicating a CCE range of the mobile station-specific search space, and information indicating the number of mobile station device-specific data addressed to its own mobile station device 2.

If no error is detected by the CRC check, but a bit sequence from which the CRC code is removed is an unexpected sequence, that is, a sequence not predefined by the wireless communication system, the control information count indicator detecting section 400 continuously detects a control information count indicator in another CCE within the mobile station-specific search space without determining that the control information count indicator addressed to its own mobile station device 2 is detected.

If an error is detected by the CRC check, the control information count indicator detecting section 400 continuously detects the control information count indicator in another CCE within the mobile station-specific search space.

Furthermore, if no control information count indicator is detected within the mobile station-specific search space of the CCE aggregation number in which the detection of the control information count indicator is performed, the detection of the control information count indicator is performed for CCEs of the next CCE aggregation number.

If a control signal indicating the start of processing is input from the control information count indicator detecting section 400, the CCE selecting section 311 starts to process CCEs.

If a control signal indicating the start of processing is not input from the control information count indicator detecting section 400, the CCE selecting section 311 does not process CCEs.

If a control signal indicating the start of processing is input from the control information count indicator detecting section 400, the CCE selecting section 311 outputs signals arranged in CCEs to the QPSK demodulation section 312 by selecting candidate CCEs in which downlink control channels whose number is indicated by the control information count indicator detecting section 400 are arranged based on CCE numbers in which the control information count indicator input from the control information count indicator detecting section 400 is detected for CCEs input from the CCE reconfiguration section 370 and a CCE range of the mobile station-specific search space. The CCE selecting section 311 outputs the signals arranged in the CCEs to the QPSK demodulation section 312 in a CCE unit of a CCE aggregation number.

Until the rear-stage processing section detects mobile station device-specific data (control information) whose number is indicated by the control information count indicator detecting section 400 included in a downlink control channel addressed to its own mobile station device 2, the CCE selecting section 311 outputs signals of CCEs within the mobile station-specific search space to the QPSK demodulation section 312, and detection information of the mobile station device-specific data included in the downlink control channel addressed to its own mobile station device 2 is input from the control section 20. Details of a CCE in which the control information count indicator is arranged and CCEs in which one or more downlink control channels including the mobile station device-specific data are arranged will be described later.

The QPSK demodulation section 312 performs QPSK demodulation for signals arranged in candidate CCEs in which one or more downlink control channels addressed to its own mobile station device 2 are arranged, and input from the CCE selecting section 311.

The Viterbi decoder section 313 decodes a signal demodulated by the QPSK demodulation section 312 based on a coding rate input from the control section 20. Here, the signal is expressed in a bit unit, and the Viterbi decoder section 313 performs rate matching for adjusting the number of bits in which Viterbi decoding processing is performed for input bits according to an instruction of the coding rate from the control section 20.

The CRC inspection section 314 performs CRC check for a bit sequence decoded by the Viterbi decoder section 313. In a state in which no error is detected by the CRC check, the CRC inspection section 314 recognizes that a bit sequence passing through the check is mobile station device-specific data addressed to its own mobile station device 2 received without an error, and outputs the mobile station device-specific data to the control section 20.

If the control information count indicator is detected as described above, processing for the downlink control channel is performed for CCEs within the mobile station-specific search space within a downlink subframe from which the control information count indicator is detected. If the mobile station device-specific data addressed to its own mobile station device 2 included in downlink control channels whose number is indicated in the control information count indicator is detected, the mobile station device 2 terminates the decoding of the downlink control channels.

The control section 20 receiving information included within the mobile station device-specific data of the one or more downlink control channels detected as described above, for example, one or more pieces of radio resource allocation information of the downlink shared data channel, instructs the demultiplexing section 320, the data demodulating section 380, and the turbo decoding section 390 to perform reception processing for the downlink shared data channel addressed to the mobile station device 2.

The mobile station ID is arranged as information combined with a CRC code for error detection among mobile station device-specific data. For example, the CRC code is generated from the mobile station device-specific data using a predetermined generating polynomial, and information taken by an exclusive OR operation with the mobile station ID of the mobile station device 2 serving as a destination of the mobile station device-specific data is arranged within the downlink control channel.

The CRC inspection section 314 determines whether or not it is the mobile station device-specific data addressed to its own mobile station device 2 along with error detection by performing the inverse processing of the above-described operation for the mobile station device-specific data using the mobile station ID of its own mobile station device 2.

The control section 20 controls the data demodulation section 380, the turbo decoding section 390, the demultiplexing section 320, and the transmission processing section 22 based on one or more mobile station device-specific data output by the CRC inspection section 314. The mobile station device-specific data includes radio resource allocation information, a modulation scheme/coding rate, a retransmission parameter, and the like. The control section 20 outputs information indicating that the mobile station device-specific data is input from the CRC inspection section 314 to the CCE selecting section 311. Since the transmission processing section 22 of the mobile station device 2 is not related to the present invention, detailed description thereof is omitted.

Next, an arrangement of one or more downlink control channels addressed to the mobile station device 2, which are the same as those of the control information count indicator, in CCEs will be described in detail.

The multiplexing section 230 of the base station device 1 multiplexes a control information count indicator into any CCE within the mobile station-specific search space of the mobile station device 2 to which the downlink control channel is allocated. Next, the multiplexing section 230 of the base station device 1 multiplexes downlink control channels whose number is indicated by the control information count indicator into CCEs within the mobile station-specific search space, which are CCEs having numbers next and subsequent to the CCE into which the control information count indicator is multiplexed. The multiplexing section 230 multiplexes the control information count indicator using CCEs whose number is the same as a CCE aggregation number of the downlink control channel. That is, if the downlink control channel is allocated using 2 CCEs, the control information count indicator is also generated and multiplexed so that it is multiplexed into 2 CCEs.

The control information count indicator detecting section 400 of the mobile station device 2 detects the control information count indicator from a CCE within the mobile station-specific search space for each CCE aggregation number. If the control information count indicator is detected, the control information count indicator detecting section 400 inputs information indicating a CCE aggregation number from which the control information count indicator is detected to the CCE selecting section 311. The CCE selecting section 311 of the mobile station device 2 sequentially selects CCEs within the mobile station-specific search space, which are CCEs having numbers next and subsequent to a CCE into which the control information count indicator is multiplexed by the CCE aggregation number, and outputs the selected CCEs to the QPSK demodulation section 312 until downlink control channels whose number is indicated by the control information count indicator including mobile station device-specific data addressed to its own mobile station device 2 are detected.

An example will be described using FIG. 4. Here, the case where the CCE aggregation number is 2, the number of CCEs constituting the mobile station-specific search space is 10, and a starting point index of CCEs is CCE 31 (belonging to subband 2) will be described.

The multiplexing section 230 of the base station device 1 multiplexes a control information count indicator into 2 CCEs of CCE 33 and CCE 34, and multiplexes downlink control channels into 2 CCEs of CCE 37 and CCE 38 and 2 CCEs of CCE 39 and CCE 40. Here, the control information count indicator indicates that 2 downlink control channels are allocated to the same mobile station device 2.

The control information count indicator detecting section 400 of the mobile station device 2 selects the mobile station-specific search space of the case where a CCE aggregation number is 2, starts to detect the control information count indicator from a CCE of CCE 31, and detects the control information count indicator in 2 CCEs of CCE 33 and CCE 34. The control information count indicator detecting section 400 of the mobile station device 2 recognizes that 2 downlink control channels are allocated to its own mobile station device 2 from the control information count indicator, and outputs its information to the CCE selecting section 311.

The CCE selecting section 311 of the mobile station device 2 outputs 2 unit CCEs from a CCE of CCE 35 to the rear-stage processing section. In the rear-stage processing section, processing of decoding the downlink control channels is performed by assuming a plurality of types of control data formats having different information amounts. The mobile station device 2 detects the downlink control channels addressed to its own mobile station device 2 in 2 CCEs of CCE 37 and CCE 38 and 2 CCEs of CCE 39 and CCE 40, and terminates decoding processing for the downlink control channels.

The control section 20 of the mobile station device 2 outputs detection information of the downlink control channels addressed to its own mobile station device 2 to the CCE selecting section 311. The CCE selecting section 311 compares the number of downlink control channels detected by the rear-stage processing section input from the control section 20 with a number indicated from the control information count indicator detecting section 400, and stops a signal output if it is determined that all downlink control channels whose number is indicated are detected.

If the control information count indicator is not detected in the mobile station-specific search space when the CCE aggregation number is 2, the control information count indicator detecting section 400 of the mobile station device 2 equally performs the detection of the control information count indicator even in the mobile station-specific search space when the CCE aggregation number is 1, 4, and 8.

The control information count indicator detecting section 400 of the mobile station device 2 may start to detect the control information count indicator from any CCE aggregation number. If the control information count indicator is detected, the control information count indicator detecting section 400 of the mobile station device 2 does not perform processing of detecting the control information count indicator in other CCE aggregation numbers.

Figure 10:
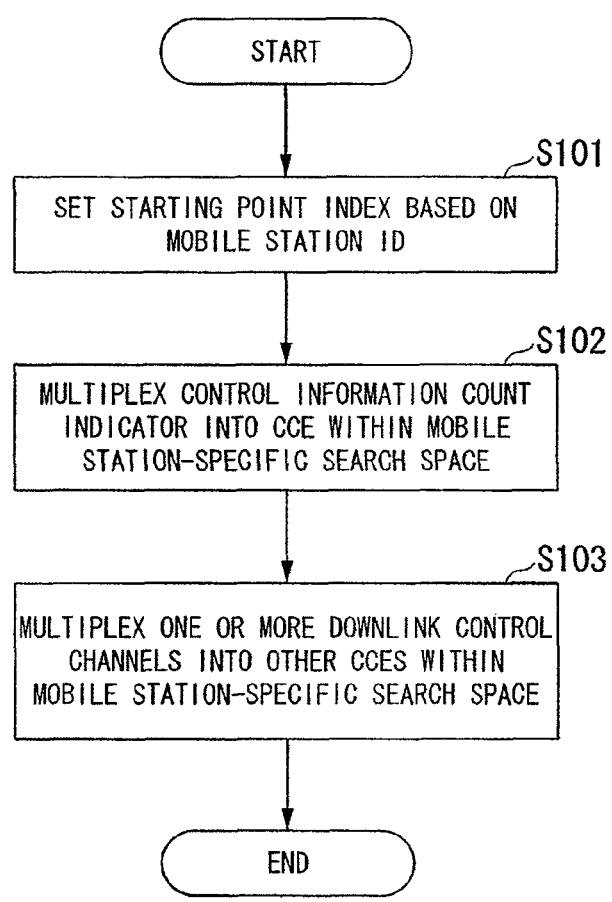
FIG. 10 is a flowchart showing processing of multiplexing a control information count indicator and one or more downlink control channels in the first embodiment of the present invention.

FIG. 10 is a flowchart showing processing of multiplexing a control information count indicator and one or more downlink control channels in the transmission processing section 22 of the base station device 1.

First, the transmission processing section 22 of the base station device 1 selects a starting point index based on a mobile station ID of the mobile station device 2 to which the downlink control channel is allocated (step S101). Next, the transmission processing section 22 of the base station device 1 multiplexes the control information count indicator into a CCE within the mobile station-specific search space based on the selected starting point index (step S102). Next, the transmission processing section 22 of the base station device 1 multiplexes one or more downlink control channels into other CCEs within the mobile station-specific search space (step S103).

Figure 11:
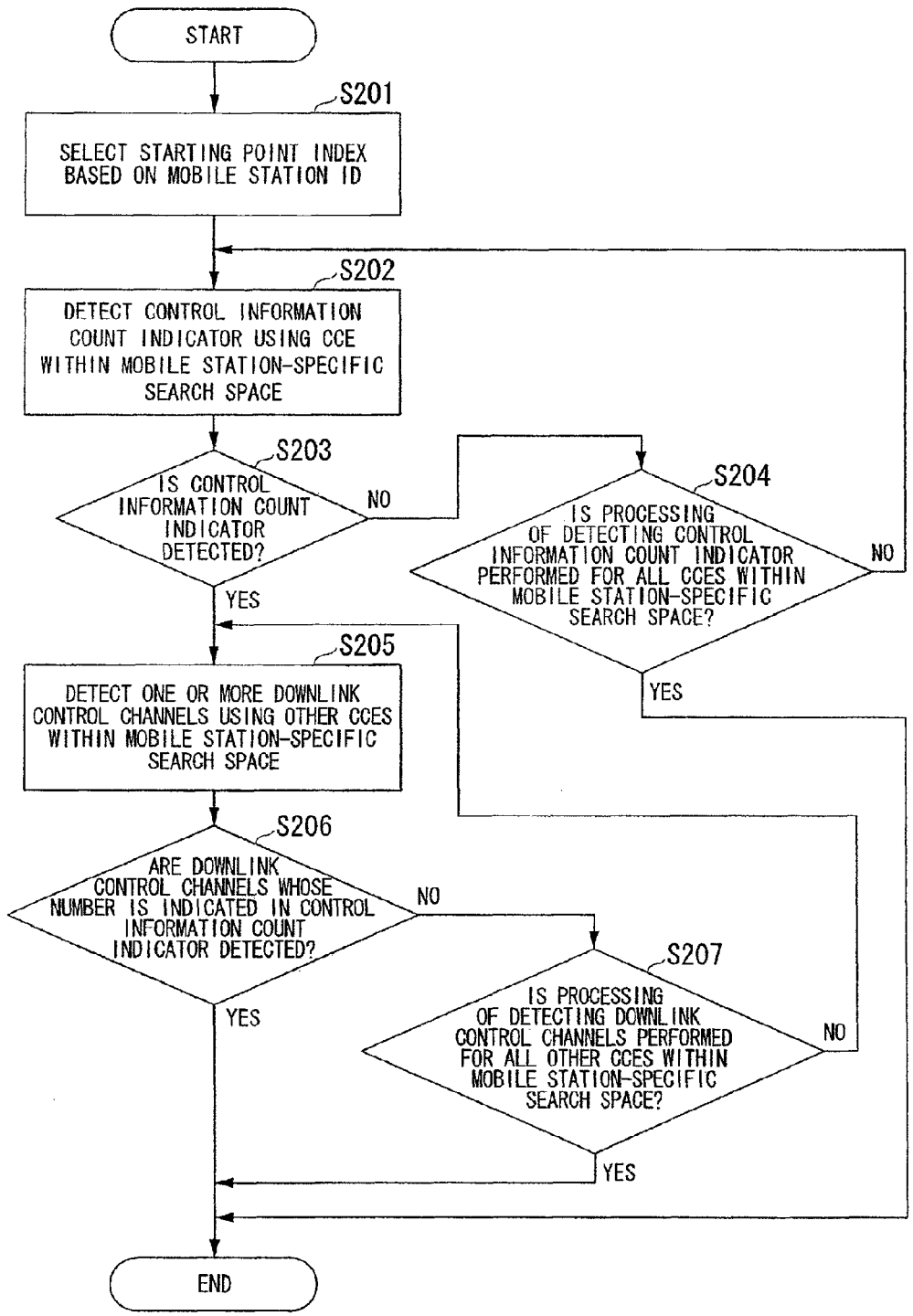
FIG. 11 is a flowchart showing processing of detecting a control information count indicator and one or more downlink control channels in the first embodiment of the present invention.

FIG. 11 is a flowchart showing processing of detecting a control information count indicator and one or more downlink control channels in the reception processing section 21 of the mobile station device 2.

First, the reception processing section 21 of the mobile station device 2 selects a starting point index based on a mobile station ID of its own mobile station device 2 (step S201). Next, the reception processing section 21 of the mobile station device 2 detects the control information count indicator using a CCE within the mobile station-specific search space based on the selected starting point index (step S202). Next, the reception processing section 21 of the mobile station device 2 determines whether or not the control information count indicator is detected (step S203).

If no control information count indicator is detected in step S203, the reception processing section 21 of the mobile station device 2 further determines whether or not the processing of detecting the control information count indicator is performed for all CCEs within the mobile station-specific search space (step S204).

If it is determined that the processing of detecting the control information count indicator is not performed for all CCEs within the mobile station-specific search space in step S204, the reception processing section 21 of the mobile station device 2 returns to step S202 to perform the processing of detecting the control information count indicator using CCEs for which the processing of detecting the control information count indicator is not yet performed. If it is determined that the processing of detecting the control information count indicator is performed for all CCEs within the mobile station-specific search space in step S204, the reception processing section 21 of the mobile station device 2 terminates the processing.

If the control information count indicator is detected in step S203, the reception processing section 21 of the mobile station device 2 detects one or more downlink control channels using other CCEs within the mobile station-specific search space (step S205). Next, the reception processing section 21 of the mobile station device 2 determines whether or not downlink control channels whose number is indicated in the control information count indicator addressed to its own mobile station device 2 are detected (step S206).

If it is determined that the downlink control channels whose number is indicated in the control information count indicator addressed to its own mobile station device 2 are detected in step S206, the reception processing section 21 of the mobile station device 2 terminates the processing. If it is determined that the downlink control channels whose number is indicated in the control information count indicator addressed to its own mobile station device 2 are not detected in step S206, the reception processing section 21 of the mobile station device 2 further determines whether or not the processing of detecting the downlink control channels is performed for all other CCEs within the mobile station-specific search space (step S207).

If it is determined that the processing of detecting the downlink control channels is performed for all other CCEs within the mobile station-specific search space in step S207, the reception processing section 21 of the mobile station device 2 terminates the processing. If it is determined that the processing of detecting the downlink control channels is not performed for all other CCEs within the mobile station-specific search space in step S207, the reception processing section 21 of the mobile station device 2 returns to step S205 to continuously detect the downlink control channels using CCEs for which the processing of detecting the downlink control channels is not yet performed.

As described above, the base station device 1 of the first embodiment of the present invention transmits a control information count indicator indicating the number of downlink control channels including mobile station device-specific data using a CCE within the mobile station-specific search space, and transmits one or more downlink control channels including mobile station device-specific data using other CCEs within the mobile station-specific search space.

The mobile station device 2 of the first embodiment of the present invention detects the control information count indicator from a CCE within the mobile station-specific search space, and decodes downlink control channels by assuming a plurality of types of control data formats having different information amounts for other CCEs within the mobile station-specific search space for detecting the downlink control channels whose number is indicated in the control information count indicator if the control information count indicator is detected.

Thereby, it is possible to reduce the processing load of decoding downlink control channels of the mobile station device 2. Particularly, it is preferable that the mobile station device 2 to which no downlink control channel is allocated perform detection processing by decoding one type of control information count indicator for each CCE aggregation number, and it is possible to reduce the processing load of decoding the downlink control channels.

It is possible to reduce the processing load since the mobile station device 2 does not need to continuously decode downlink control channels until a possible number of downlink control channels are detected for each downlink subframe using a control information count indicator.

The case where the control information count indicator is QPSK-modulated like the downlink control channel and the transmission signal of the control information count indicator is generated by convolutional coding has been described in the first embodiment, but other signal configurations may be used. For example, the QPSK modulation may be performed without adding the CRC code to a bit sequence indicating the number of downlink control channels simultaneously allocated, and it may be generated by multiplying a scrambling code specific to the mobile station device 2.

If a correlation value exceeds a predefined threshold value, the mobile station device 2 may determine that the control information count indicator is detected using a scrambling code of its own mobile station device 2 for a CCE signal, and may perform the QPSK modulation by removing the multiplied scrambling code from the CCE signal.

BPSK modulation, not the QPSK modulation, may be used.

The case where one or more downlink control channels including mobile station device-specific data are multiplexed into any CCEs within the mobile station-specific search space, which are CCEs having numbers next and subsequent to that of a CCE into which the control information count indicator is multiplexed, has been described in the first embodiment, but the downlink control channel may be pre-limited to be multiplexed into a specific CCE. For example, one or more downlink control channels may be pre-limited to be multiplexed from CCEs having numbers next to those of CCEs into which the control information count indicator is multiplexed.

Thereby, it is possible to reduce the processing load of decoding downlink control channels of the mobile station device 2.

In response to the number of downlink control channels simultaneously allocated, a CCE space (mobile station-specific search area) into which the downlink control channel is multiplexed may be controlled.

An example will be described using FIG. 4. Here, the case where a CCE aggregation number is 2, the number of CCEs constituting the mobile station-specific search space is 10, and a starting point index of CCEs is CCE 25 (belonging to subband 2) will be described.

For example, if 2 downlink control channels are allocated to the mobile station device 2, the multiplexing section 230 of the base station device 1 multiplexes the 2 downlink control channels respectively including 2 CCEs into CCEs up to CCE 34.

If the control information count indicator indicates that the 2 downlink control channels are allocated, the control information count indicator detecting section 400 of the mobile station device 2 instructs the CCE selecting section 311 to output signals of CCEs up to CCE 34 to the rear-stage processing section so as to decode and detect the 2 downlink control channels respectively including the 2 CCEs. That is, in this case, the mobile station-specific search space is not extended.

If 4 downlink control channels are allocated to the mobile station device 2, the multiplexing section 230 of the base station device 1 multiplexes the 4 downlink control channels respectively including 2 CCEs into CCEs up to CCE 40.

If the control information count indicator indicates that the 4 downlink control channels are allocated, the control information count indicator detecting section 400 of the mobile station device 2 instructs the CCE selecting section 311 to output signals of CCEs up to CCE 40 to the rear-stage processing section so as to decode and detect the 4 downlink control channels respectively including the 2 CCEs. That is, in this case, the mobile station-specific search space is extended.

The degree of freedom of multiplexing downlink control channels is increased by adding the processing load of decoding downlink control channels to the mobile station device 2 to which many downlink control channels are simultaneously allocated.

Thereby, it is possible to control the processing load of decoding downlink control channels of the mobile station device 2 and the degree of freedom of multiplexing the downlink control channels in response to the number of downlink control channels simultaneously allocated.

When a CCE space (mobile station-specific search space) where downlink control channels are multiplexed is controlled in response to the number of downlink control channels simultaneously allocated, the number of CCEs to be controlled for each CCE aggregation number may be different.

The case where the control information count indicator is multiplexed into any CCE of CCEs within the mobile station-specific search space has been described in the first embodiment, but the control information count indicator may be pre-limited to be multiplexed into a specific CCE. For example, the control information count indicator may be pre-limited to be multiplexed into a CCE having a first number within the mobile station-specific search space.

Thereby, it is possible to reduce the processing load of detecting the control information count indicator of the mobile station device 2.

The control information count indicator may be multiplexed into only a specific number of CCE aggregation numbers. That is, the control information count indicator may be arranged in a specific number of CCEs. For example, if the CCE aggregation number of the downlink control channel is CCE aggregation 1 (constituted by 1 CCE), CCE aggregation 2 (constituted by 2 CCEs), CCE aggregation 4 (constituted by 4 CCEs), and CCE aggregation 8 (constituted by 8 CCEs), the control information count indicator is set to be multiplexed into only CCE aggregation 1 and CCE aggregation 4.

If one or more downlink control channels constituted by CCE aggregation 1 are allocated to the mobile station device 2 or if one or more downlink control channels constituted by CCE aggregation 2 are allocated to the mobile station device 2, the control information count indicator is multiplexed into CCE aggregation 1. If one or more downlink control channels constituted by CCE aggregation 4 are allocated to the mobile station device 2 or if one or more downlink control channels constituted by CCE aggregation 8 are allocated to the mobile station device 2, the control information count indicator is multiplexed into CCE aggregation 4.

If the control information count indicator is detected in CCE aggregation 1, the mobile station device 2 performs processing of decoding and detecting one or more downlink control channels allocated by CCE aggregation 1 and CCE aggregation 2. If the control information count indicator is detected in CCE aggregation 4, the mobile station device 2 performs processing of decoding and detecting one or more downlink control channels allocated by CCE aggregation 4 and CCE aggregation 8.

Information regarding a CCE aggregation number of a downlink control channel may be included in the control information count indicator.

Thereby, a limitation that CCE aggregation numbers of the control information count indicator and the downlink control channel should be identical is removed.

A CCE aggregation number of the control information count indicator, that is, the number of CCEs to be used in multiplexing of 1 control information count indicator, is pre-limited, and the mobile station device 2 may detect the control information count indicator only in a limited CCE aggregation number.

Thereby, the processing load of detecting the control information count indicator of the mobile station device 2 can be reduced.

Second Embodiment

The case where information indicating the number of mobile station device-specific data of each subband allocated to the same mobile station device 2, that is, the number of downlink control channels, is configured in a control information count indicator will be described as the second embodiment of the present invention.

Figure 12:
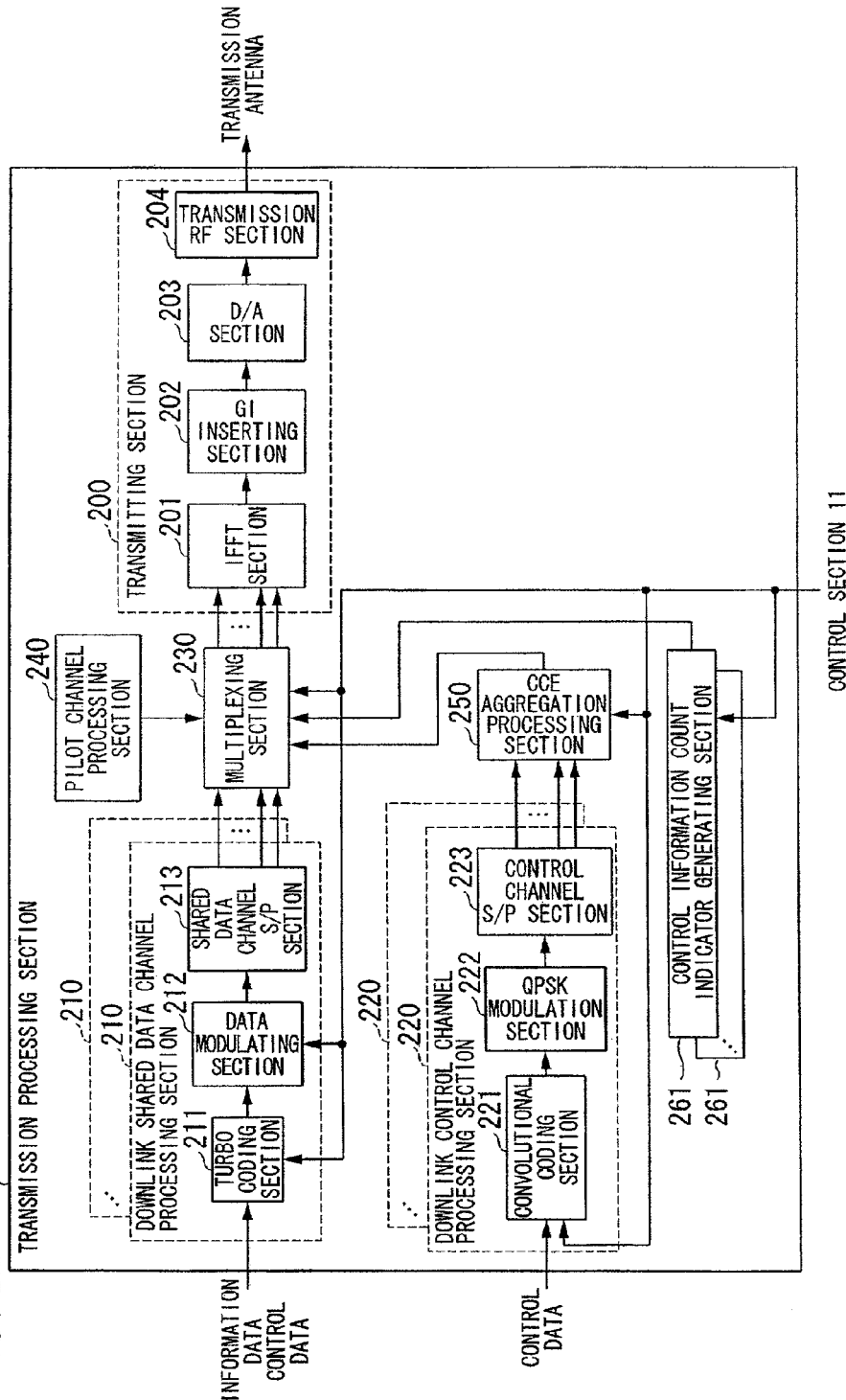
FIG. 12 is a schematic block diagram showing an internal configuration of a transmission processing section of a base station according to a second embodiment of the present invention.
Figure 13:
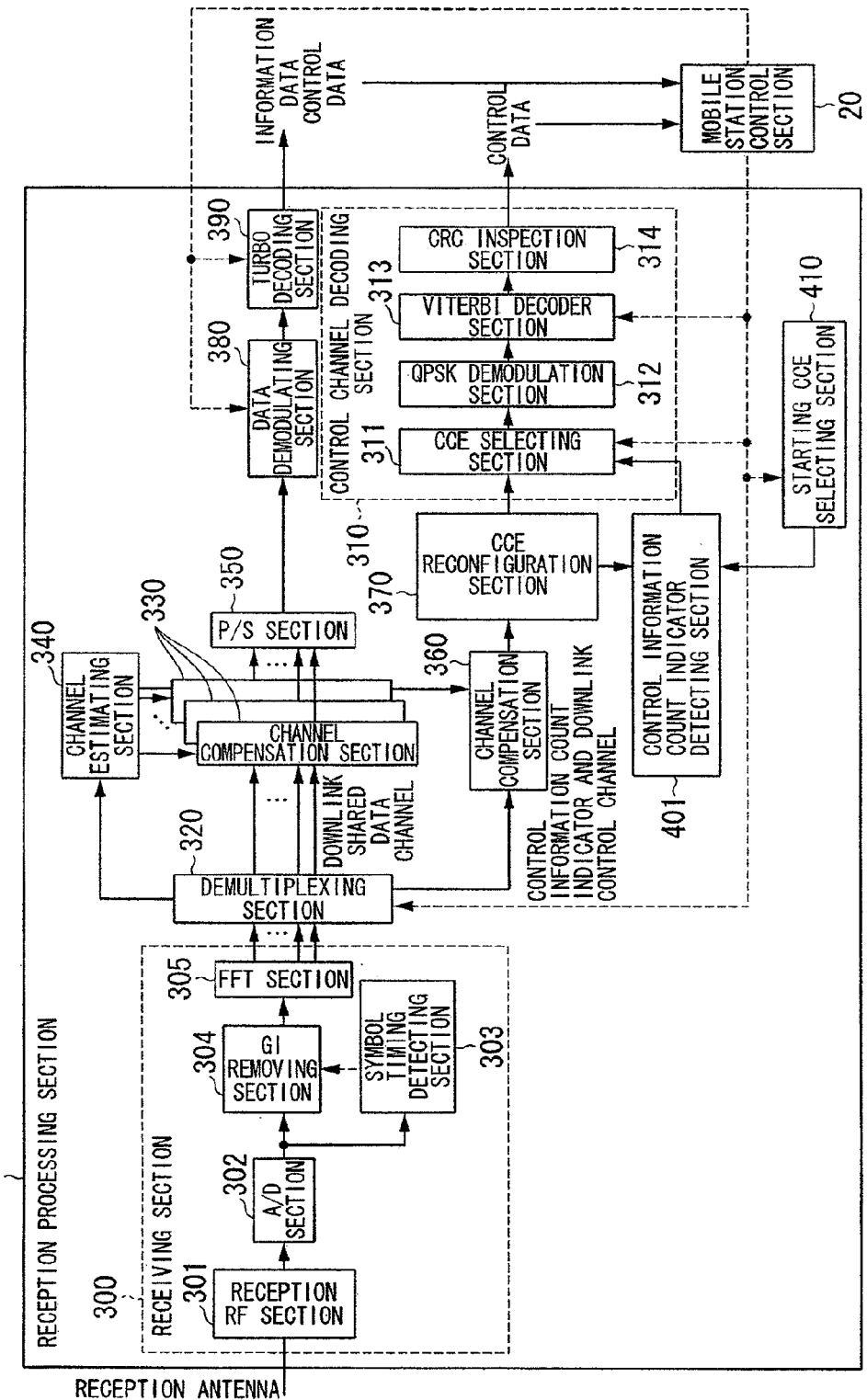
FIG. 13 is a schematic block diagram showing an internal configuration of a reception processing section of a mobile station according to the second embodiment of the present invention.
Figure 17:
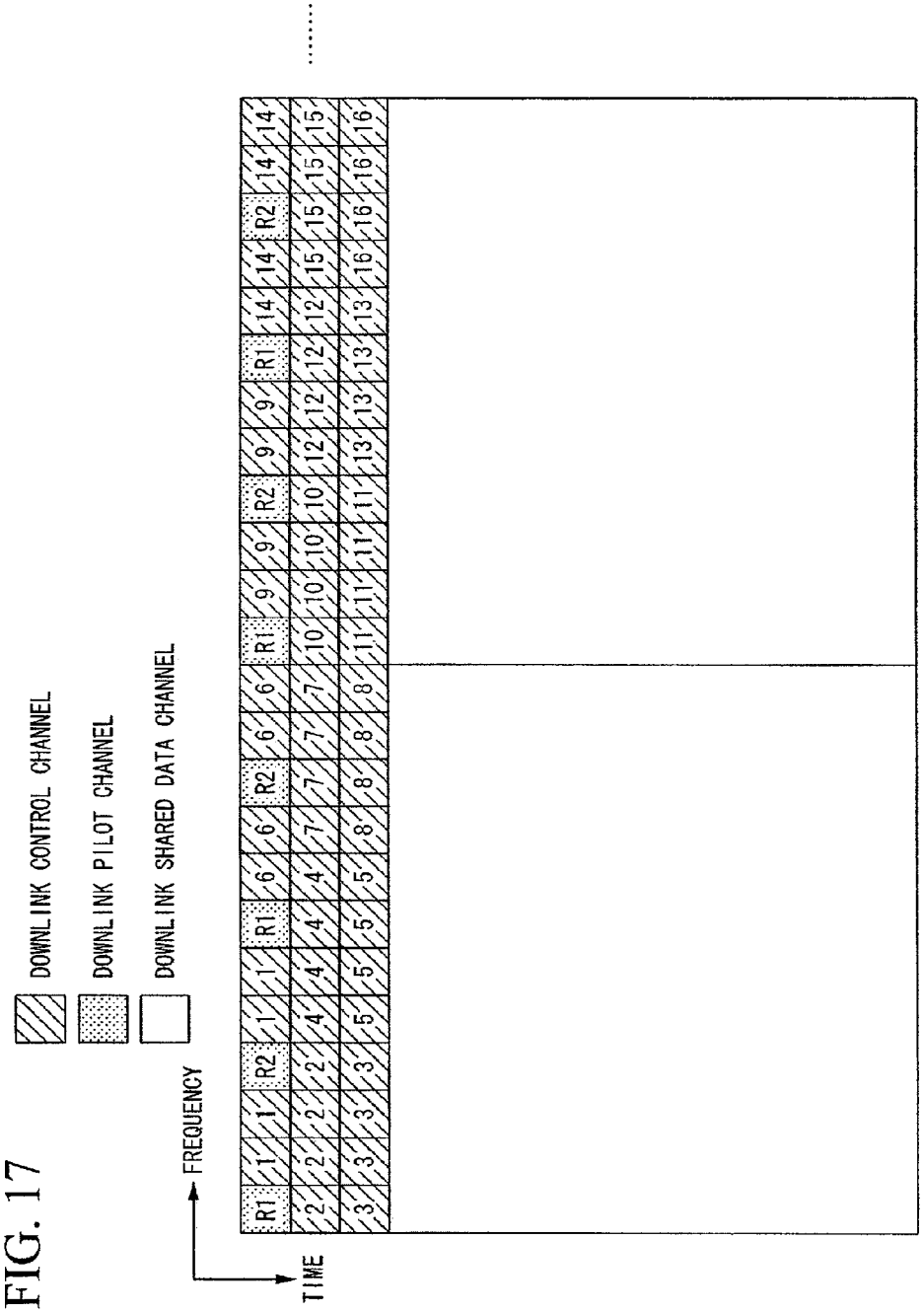
FIG. 17 is a diagram illustrating an arrangement example of resource element groups in a downlink subframe in EUTRA.

In the second embodiment, functions of a control information count indicator generating section 261 within a transmission processing section 12*a* of a base station device 1 shown in FIG. 12 and a control information count indicator detecting section 401 within a reception processing section 21*a* of a mobile station device 2 shown in FIG. 13 are different. Since other configurations are identical to those of the first embodiment, description thereof is omitted.

The control information count indicator generating section 261 of the base station device 1 generates a control information count indicator including information indicating the number of downlink control channels of each subband allocated to the same mobile station device 2. The number of downlink control channels of each subband allocated to the same mobile station device 2 is designated by the control section 11 of the base station device 1.

If a control information count indicator addressed to its own mobile station device 2 is detected in a CCE within a mobile station-specific search space, the control information count indicator detecting section 401 of the mobile station device 2 outputs a control signal of an instruction for starting processing to the CCE selecting section 311 along with a CCE number in which the control information count indicator is detected, information indicating a CCE range of the mobile station-specific search space, a CCE aggregation number in which the control information count indicator is detected, and information indicating the number of mobile station device-specific data addressed to its own mobile station device 2 of each subband indicated by the control information count indicator.

The CCE selecting section 311 outputs a CCE signal of each selected subband to the rear-stage processing section based on a control signal input from the control information count indicator detecting section 401.

An example of the second embodiment will be described using FIG. 4. Here, the case where the CCE aggregation number is 2, the number of CCEs constituting the mobile station-specific search space is 10, and a starting point index of CCEs is CCE 31 (belonging to subband 2) will be described.

The control section 11 of the base station device 1 designates signals of 4 downlink control channels in which a CCE aggregation number including mobile station device-specific data is 2 to be multiplexed into CCEs of CCE 35 and CCE 36, CCE 51 and CCE 52, CCE 53 and CCE 54, and CCE 95 and CCE 96, and outputs a control signal including information regarding CCEs into which the downlink control channels are multiplexed to the transmission processing section 22. The control section 11 of the base station device 1 designates the control information count indicator to be multiplexed into CCEs of CCE 33 and CCE 34, and outputs a control signal including information regarding the CCEs into which the control information count indicator is multiplexed to the transmission processing section 22.

Based on a control signal input from the control section 11, the control information count indicator generating section 261 of the base station device 1 generates a control information count indicator indicating that the number of downlink control channels allocated in subband 1 is 0, that the number of downlink control channels allocated in subband 2 is 1, that the number of downlink control channels allocated in subband 3 is 2, that the number of downlink control channels allocated in subband 4 is 0, and that the number of downlink control channels allocated in subband 5 is 1, and outputs the control information count indicator to the multiplexing section 230.

The multiplexing section 230 of the base station device 1 multiplexes a signal of a control information count indicator input from the control information count indicator generating section 261 into CCEs of CCE 33 and CCE 34, and multiplexes signals of 4 downlink control channels addressed to the same mobile station device 2 into CCEs of CCE 35 and CCE 36, CCE 51 and CCE 52, CCE 53 and CCE 54, and CCE 95 and CCE 96.

The control information count indicator detecting section 401 of the mobile station device 2 performs processing of detecting a control information count indicator for every 2 CCEs of CCE 31, CCE 32, CCE 33, CCE 34, CCE 35, CCE 36, CCE 37, CCE 38, CCE 39, and CCE 40, which are a mobile station-specific search space, and detects the control information count indicator in the CCEs of CCE 33 and CCE 34.

The control information count indicator detecting section 401 detecting a control information count indicator outputs a control signal for an instruction to start the processing to the CCE selecting section 311 along with information indicating that the number of downlink control channels allocated in subband 1 is 0, that the number of downlink control channels allocated in subband 2 is 1, that the number of downlink control channels allocated in subband 3 is 2, that the number of downlink control channels allocated in subband 4 is 0, and that the number of downlink control channels allocated in subband 5 is 1, included in the control information count indicator, information indicating that a CCE in which the control information count indicator is detected is CCE 33 and CCE 34, information indicating that the mobile station-specific search space is CCE 31 to CCE 40, and information indicating that a CCE aggregation number in which the control information count indicator is detected is 2.

Based on a control signal input from the control information count indicator detecting section 401, the CCE selecting section 311 outputs signals of every 2 CCEs of CCE 35 to CCE 40 in subband 2, CCE 51 to CCE 60 in subband 3, and CCE 91 to CCE 100 in subband 5 to the rear-stage processing section. When signals of CCEs of a subband in which the control information count indicator is detected are output to the rear-stage processing section, the CCE selecting section 311 outputs signals of CCEs subsequent to a CCE number in which the control information count indicator is detected within the mobile station-specific search space to the rear-stage processing section.

If signals of CCEs of a subband in which no control information count indicator is detected are output to the rear-stage processing section, the CCE selecting section 311 outputs signals of CCEs of a subband whose numbers are relatively identical to those of CCEs of the mobile station-specific search space to the rear-stage processing section. CCE 31 to CCE 40, which are CCEs of the mobile station-specific search space, are CCEs whose CCE numbers are $11^{th}$ to $20^{th}$ in subband 2. Accordingly, the CCE selecting section 311 outputs signals of CCEs of CCE 51 to CCE 60, which are CCEs whose CCE numbers are $11^{th}$ to $20^{th}$ in subband 3, and signals of CCEs of CCE 91 to CCE 100, which are CCEs whose CCE numbers are $11^{th}$ to $20^{th}$ in subband 5, to the rear-stage processing section.

As described above, a relationship of CCEs whose orders are identical between different subbands is referred to as a relationship of CCEs whose numbers are relatively identical in the subbands. Via the rear-stage processing section, the control section 20 of the mobile station device 2 acquires mobile station device-specific data included in 1 downlink control channel addressed to its own mobile station device 2 in CCEs of CCE 35 and CCE 36 of subband 2, mobile station device-specific data included in 2 downlink control channel addressed to its own mobile station device 2 in CCEs of CCE 51 and CCE 52 and CCE 53 and CCE 54 of subband 3, and mobile station device-specific data included in 1 downlink control channel addressed to its own mobile station device 2 in CCEs of CCE 95 and CCE 96 of subband 5.

If the mobile station device-specific data included in the downlink control channel is acquired, the control section 20 outputs information indicating the subband numbers to which the downlink control channels belong to the CCE selecting section 311 along with information indicating that the mobile station device-specific data is acquired.

If all downlink control channels allocated within the subbands are detected based on the information input from the control section 20 and the information input from the control information count indicator detecting section 401, the CCE selecting section 311 stops an output of a signal of a CCE in which a downlink control channel is not yet decoded and detected within the subband to the rear-stage processing section.

The mobile station device 2 acquires information data included in a downlink shared data channel based on radio resource allocation information of the downlink shared data channel included in mobile station device-specific data of each acquired downlink control channel.

As described above, the second embodiment of the present invention includes information indicating the number of mobile station device-specific data of each subband allocated to the same mobile station device 2, that is, the number of downlink control channels. Thereby, processing accompanying decoding of a downlink control channel is increased, but it is possible to increase the degree of freedom of multiplexing the downlink control channel.

One or more downlink control channels may be multiplexed from a specific CCE without designating a CCE which a signal of a downlink control channel is multiplexed within a subband in which a control information count indicator is not multiplexed for any CCE of the subband whose number is relatively identical to that of a CCE of a mobile station specific-search space.

For example, one or more downlink control channels may be multiplexed from a CCE whose CCE number is relatively identical to that of a CCE into which a control information count indicator is multiplexed within a subband in which the control information count indicator is not multiplexed.

For simplicity of description, an example will be described using FIG. 4 described in the second embodiment. If the control information count indicator is multiplexed using 2 CCEs from CCE 33 whose CCE number is $13^{th}$ within subband 2, 2 downlink control channels may be multiplexed using 4 CCEs from CCE 53 whose number is $13^{th}$ within subband 3.

One or more downlink control channels may be multiplexed from a CCE whose CCE number is relatively identical to that of a CCE next to a CCE into which a control information count indicator is multiplexed in any subband.

CCE numbering different from that of FIG. 4 may be used. FIG. 14 is a diagram illustrating numbering of CCEs within a system band according to the second embodiment of the present invention. In FIG. 14, the case where 5 subbands are configured within the system band and 20 CCEs are configured in each subband is shown. The number of subbands and the number of CCEs of FIG. 14 are the same as those of FIG. 4. In the frequency domain of FIG. 14, it is assumed that the ascending order of frequency is subband 1<subband 2<subband 3<subband 4<subband 5.

First, the base station device 1 interleaves resource elements by the above-described block interleaver in subband 1. The base station device 1 numbers CCEs respectively including 9 resource element groups as CCE 1, CCE 2, CCE 3, CCE 4, CCE 5, CCE 6, CCE 7, CCE 8, CCE 9, CCE 10, CCE 11, CCE 12, CCE 13, CCE 14, CCE 15, CCE 16, CCE 17, CCE 18, CCE 19, and CCE 20 in order of output from the block interleaver.

Furthermore, subbands are also equally numbered. Numbering is performed as CCE (1, 1), CCE (1, 2), CCE (1, 3), CCE (1, 4), CCE (1, 5), CCE (1, 6), CCE (1, 7), CCE (1, 8), CCE (1, 9), CCE (1, 10), CCE (1, 11), CCE (1, 12), CCE (1, 13), CCE (1, 14), CCE (1, 15), CCE (1, 16), CCE (1, 17), CCE (1, 18), CCE (1, 19), and CCE (1, 20). Here, for example, in CCE (X, Y), X represents the number of a subband and Y represents the number of a CCE within the subband.

Subsequently, likewise, numbering is also performed as CCE (2, 1) to CCE (2, 20) for CCEs of subband 2. Continuously, likewise, numbering is also performed for CCEs of subband 3, subband 4, and subband 5.

An example will be described using FIG. 14. The case where a CCE aggregation number is 2, the number of CCEs constituting a mobile station-specific search space is 10, and a starting point index of CCEs is CCE (2, 11) (belonging to subband 2) will be described.

The base station device 1 multiplexes signals of 4 downlink control channels in which a CCE aggregation number including mobile station device-specific data is 2 into CCEs of CCE (2, 15) and CCE (2, 16), CCE (3, 11) and CCE (3, 12), CCE (3, 13) and CCE (3, 14), and CCE (5, 15) and CCE (5, 16).

The base station device 1 generates a control information count indicator indicating that the number of downlink control channels allocated in subband 1 is 0, that the number of downlink control channels allocated in subband 2 is 1, that the number of downlink control channels allocated in subband 3 is 2, that the number of downlink control channels allocated in subband 4 is 0, and that the number of downlink control channels allocated in subband 5 is 1. The base station device 1 multiplexes the control information count indicator into CCEs of CCE (2, 13) and CCE (2, 14).

The mobile station device 2 performs processing of detecting a control information count indicator for every 2 CCEs of CCE (2, 11), CCE (2, 12), CCE (2, 13), CCE (2, 14), CCE (2, 15), CCE (2, 16), CCE (2, 17), CCE (2, 18), CCE (2, 19), and CCE (2, 20), which are a mobile station-specific search space, and detects the control information count indicator in the CCEs of CCE (2, 13) and CCE (2, 14).

The mobile station device 2 detecting the control information indicator selects CCEs of each subband in which processing of decoding a downlink control channel is performed based on information indicating that the number of downlink control channels allocated in subband 1 is 0, that the number of downlink control channels allocated in subband 2 is 1, that the number of downlink control channels allocated in subband 3 is 2, that the number of downlink control channels allocated in subband 4 is 0, and that the number of downlink control channels allocated in subband 5 is 1, included in the control information count indicator, information indicating that the control information count indicator is detected in CCE (2, 13) and CCE (2, 14), information indicating that the mobile station-specific search space is CCE (2, 11) to CCE (2, 20), and information that a CCE aggregation number in which the control information count indicator is detected is 2.

The mobile station device 2 decodes a downlink control channel from signals of every 2 CCEs of CCE (2, 15) to CCE (2, 20) in subband 2, CCE (3, 11) to CCE (3, 20) in subband 3, and CCE (5, 11) to CCE (5, 20) in subband 5.

If processing of decoding a downlink control channel is performed for a CCE signal of a subband in which a control information count indicator is detected, the mobile station device 2 performs processing of decoding a downlink control channel from a CCE signal subsequent to a CCE number in which the control information count indicator is detected within a mobile station-specific search space.

If processing of decoding a downlink control channel is performed for a CCE signal of a subband in which a control information count indicator is not detected, the mobile station device 2 performs processing of decoding a downlink control channel for a signal of a CCE of the subband whose CCE number is relatively identical to that of a CCE of the mobile station-specific search space.

The mobile station device 2 detects 1 downlink control channel addressed to its own mobile station device 2 in CCEs of CCE (2, 15) and CCE (2, 16) of subband 2, 2 downlink control channels addressed to its own mobile station device 2 in CCEs of CCE (3, 11) and CCE (3, 12) and CCE (3, 13) and CCE (3, 14) of subband 3, and 1 downlink control channel addressed to its own mobile station device 2 in CCEs of CCE (5, 15) and CCE (5, 16) of subband 5, and acquires mobile station device-specific data.

The mobile station device 2 stops processing of decoding a downlink control channel for CCEs for which processing of decoding and detecting a downlink control channel is not yet performed within a subband if all downlink control channels are detected within the subband based on the number of downlink control channels detected in each subband and the number of downlink control channels allocated to each subband indicated in a control information count indicator.

A program operating in the mobile station device 2 and the base station device 1 according to the present invention is a program that controls a CPU or the like (a program that causes a computer to function) to realize the functions of the devices. Information handled in the devices is temporarily accumulated in a RAM when the information is processed, is subsequently stored in various ROMs or HDDs, and is read out, amended, and written in by the CPU as necessary.

A recording medium to record the program thereon may be provided as any one of a semiconductor medium (for example, ROM, nonvolatile memory card, or the like), an optical recording medium (for example, DVD, MO, MD, CD, BD, or the like), and a magnetic recording medium (for example, magnetic tape, flexible disk, or the like).

By executing the loaded program, the functions of the above embodiments may be realized. In addition, processing in cooperation with an operating system or another application program, or the like based on an instruction from the program may also realize the functions of the present invention.

For market distribution, the program may be recorded on a portable recording medium to be distributed or may be transferred to a server computer connected via a network, such as the Internet. In this case, a storage device of the server computer is also included in the present invention.

The embodiments of the present invention have been described in detail with reference to the drawings. However, specific configurations are not limited to the embodiments and may include any design in the scope without departing from the subject matter of the present invention.

INDUSTRIAL APPLICABILITY

A wireless communication system of the present invention is applicable to a mobile station device and a base station device of a mobile communication system such as a mobile phone or the like.

REFERENCE SYMBOLS

1: Base station device
2: Mobile station device
10: Radio resource control section
11: Control section
12, 12a: Transmission processing section
13: Reception processing section
20: Control section
21, 21a: Reception processing section
22: Transmission processing section
200: Transmitting section
201: IFFT section
202: GI inserting section
203: D/A section
204: Transmission RF section
210: Downlink shared data channel processing section
211: Turbo decoding section
212: Data modulating section
213: Shared data channel S/P section
220: Downlink control channel processing section
221: Convolutional coding section
222: QPSK modulation section
223: Control channel S/P section
230: Multiplexing section
240: Pilot channel processing section
250: CCE aggregation processing section
260, 261: Control information count indicator generating section
300: Receiving section
301: Reception RF section
302: A/D section
303: Symbol timing detecting section
304: GI removing section
305: FFT section
310: Control channel decoding section
311: CCE selecting section
312: QPSK demodulation section
313: Viterbi decoder section
314: CRC inspection section
320: Demultiplexing section
330: Channel compensation section
340: Channel estimating section
350: P/S section
360: Channel compensation section
370: CCE reconfiguration section
380: Data demodulating section
390: Turbo decoding section
400, 401: Control information count indicator detecting section
410: Starting CCE selecting section

The invention claimed is:

1. A mobile station device comprising:
receiving circuitry configured and/or programmed to
receive at least one downlink control channel, the at least one downlink control channel including at least one control channel element among a plurality of control channel elements, each of the plurality of the control channel elements including a plurality of time/frequency resources in a frequency band among a plurality of frequency bands, each of the plurality of the frequency bands including a plurality of continuous subcarriers in a downlink, and
receive a downlink shared data channel in the plurality of the frequency bands; acquiring circuitry configured and/or programmed to acquire, from the at least one downlink control channel, first information and second information as radio resource allocation information of the downlink shared data channel, the first information indicating one of the plurality of the frequency bands, the second information indicating at least one resource block;
determination circuitry configured and/or programmed to determine the number of the control channel elements included in a domain of the one frequency band of the plurality of the frequency bands, the determination being made in connection with the domain including the plurality of control channel elements in which the at least one downlink control channel is decoded,
the at least one downlink control channel being allocated with a signal generated from third information and control information, the third information having been obtained by an exclusive OR operation of a mobile station identification and a cyclic redundancy check (CRC) generated from the control information, and the control information being unique to the mobile station device and including at least the radio resource allocation information, and
the determination being made based on the number of the downlink control channels in the one frequency band of the plurality of the frequency bands, the at least one downlink control channel including the radio resource allocation information, wherein decoding and detection is performed on the at least one downlink control channel;
decoding circuitry configured and/or programmed to decode the signal allocated in the domain based on the determined number of control channel elements; and
detecting circuitry configured and/or programmed to detect the third information and the control information from a decoding result, the detected control information including the first information and the second information.

2. The mobile station device according to claim 1, wherein
the determination circuitry is configured to receive setting information regarding allocation relationship between the at least one downlink control channel and the one frequency band, and
the determination is made by using the setting information.

3. The mobile station device according to claim 2, wherein
the setting information indicates, regarding the plurality of the frequency bands, whether or not there is any frequency band to which the at least one downlink control channel is not allocated.

4. The mobile station device according to claim 2, wherein
the setting information includes first identification information of a first frequency band and second identification information of a second frequency band, the first frequency band not being allocated to the at least one downlink control channel, and the second frequency band being allocated to the at least one downlink control channel.

5. The mobile station device according to claim 2, wherein
the setting information indicates whether or not there is the at least one downlink control channel for at least one of the plurality of the frequency bands.

6. The mobile station device according to claim 1, wherein
the domain is capable of including a set of control channel elements having a different aggregation number, and
the number of the control channel elements included in the domain is determined based on the aggregation number.

7. The mobile station device according to claim 1, wherein
the signal allocated in the domain is decoded by setting the index of a control channel element from which the detecting or the decoding is started.

8. A base station device comprising:
transmitting circuitry configured and/or programmed to
transmit at least one downlink control channel, the at least one downlink control channel including at least one control channel element among a plurality of control channel elements, each of the plurality of the control channel elements including a plurality of time/frequency resources in a frequency band among a plurality of frequency bands, each of the plurality of the frequency bands including a plurality of continuous subcarriers in a downlink,
transmit a downlink shared data channel in the plurality of the frequency bands, the at least one downlink control channel including first information and second information as radio resource allocation information of the downlink shared data channel, the first information indicating one of the plurality of the frequency bands, and the second information indicating at least one resource block;
control circuitry configured and/or programmed to control the number of the control channel elements included in a domain of the one frequency band of the plurality of the frequency bands, the control being made in connection with the domain including the plurality of control channel elements in which the downlink control channel is decoded,
the downlink control channel being allocated with a signal generated from third information and control information, the third information having been obtained by an exclusive OR operation of a mobile station identification and a cyclic redundancy check (CRC) generated from the control information, and the control information being unique to the mobile station apparatus and including at least the radio resource allocation information, and
the control being made based on the number of the downlink control channels in the one frequency band of the plurality of the frequency bands, the at least one downlink control channel including the radio resource allocation information, wherein decoding and detection is performed on the at least one downlink control channel, wherein
the signal allocated in the domain is decoded by the mobile station device,
the third information and the control information are detected by the mobile station device from a decoding result, and
the detected control information includes the first information and the second information.

9. A control method to be performed by a mobile station device, the control method comprising:
receiving at least one downlink control channel, the at least one downlink control channel including at least one control channel element among a plurality of control channel elements, each of the plurality of the control channel elements including a plurality of time/frequency resources in a frequency band among a plurality of frequency bands, each of the plurality of the frequency bands including a plurality of continuous subcarriers in a downlink;
receiving a downlink shared data channel in the plurality of the frequency bands;
acquiring, from the at least one downlink control channel, first information and second information as radio resource allocation information of the downlink shared data channel, the first information indicating one of the plurality of the frequency bands, and the second information indicating at least one resource block;
determining the number of the control channel elements included in a domain of the one frequency band of the plurality of the frequency bands, the determination being made in connection with the domain including the plurality of control channel elements in which the at least one downlink control channel is decoded,
the at least one downlink control channel being allocated with a signal generated from third information and control information, the third information having been obtained by subject to an exclusive OR operation with of a mobile station identification to and a cyclic redundancy check (CRC) generated from the control information, and the control information being unique to the mobile station device and including at least the radio resource allocation information, and
the determining being made based on the number of the downlink control channels in the one frequency band of the plurality of the frequency bands, the downlink control channel including the radio resource allocation information, wherein decoding and detection is performed on the at least one downlink control channel being to be performed a decoding and a detection;

decoding the signal allocated in the domain based on the determined number of control channel elements; and detecting the third information and the control information from a decoding result, the detected control information including the first information and the second information.

10. A control method to be performed by a base station device, the control method comprising:

transmitting at least one downlink control channel, the at least one downlink control channel including at least one control channel element among a plurality of control channel elements, each of the plurality of the control channel elements including a plurality of time/frequency resources in a frequency band among a plurality of frequency bands, each of the plurality of the frequency bands including a plurality of continuous subcarriers in a downlink, transmitting a downlink shared data channel in the plurality of the frequency bands, the at least one downlink control channel including first information and second information as radio resource allocation information of the downlink shared data channel, the first information indicating one of the plurality of the frequency bands, and the second information indicating at least one resource block, the control method comprising:

controlling the number of the control channel elements included in a domain of the one frequency band of the plurality of the frequency bands, the control being made in connection with the domain including the plurality of control channel elements in which the at least one downlink control channel is decoded, the downlink control channel being allocated with a signal generated from third information and control information, the third information having been obtained by subject to an exclusive OR operation with of a mobile station identification to and a cyclic redundancy check (CRC) generated from the control information, and the control information being unique to the mobile station apparatus and including at least the radio resource allocation information, and the control being made based on the number of the downlink control channels in the one frequency band of the plurality of the frequency bands, the downlink control channel including the radio resource allocation information, wherein decoding and detection is performed on the at least one downlink control channel being to be performed a decoding and a detection, wherein the signal allocated in the domain is decoded by the mobile station device, and the third information and the control information are detected by the mobile station device from a decoding result, and the detected control information includes the first information and the second information.

* * * * *